(12) United States Patent
Jorgensen et al.

(10) Patent No.: US 10,571,128 B2
(45) Date of Patent: Feb. 25, 2020

(54) GAS TURBINE FUEL COMPONENTS

(71) Applicant: ANSALDO ENERGIA IP UK LIMITED, London (GB)

(72) Inventors: Stephen W. Jorgensen, Palm City, FL (US); Joshua R. McNally, Jupiter, FL (US); Douglas Pennell, Bir (CH); Donald Gauthier, Jupiter, FL (US); Pawel Matys, Jupiter, FL (US); Marc Paskin, Parkland, FL (US); Thomas R. Ruck, Rekingen (CH); Peter John Stuttaford, Jupiter, FL (US); Bernard Tam-Yen Sam, Orlando, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 443 days.

(21) Appl. No.: 15/194,209

(22) Filed: Jun. 27, 2016

(65) Prior Publication Data

US 2017/0002743 A1    Jan. 5, 2017

Related U.S. Application Data

(60) Provisional application No. 62/186,907, filed on Jun. 30, 2015.

(51) Int. Cl.
*F23R 3/28* (2006.01)
*F23R 3/34* (2006.01)
(Continued)

(52) U.S. Cl.
CPC .............. *F23R 3/346* (2013.01); *F02C 7/222* (2013.01); *F02C 7/232* (2013.01); *F23R 3/002* (2013.01); *F23R 3/14* (2013.01); *F23R 3/20* (2013.01); *F23R 3/283* (2013.01); *F23R 3/286* (2013.01); *F23R 3/343* (2013.01); *F23R 3/36* (2013.01); *F23R 3/44* (2013.01); *F23R 3/54* (2013.01);
(Continued)

(58) Field of Classification Search
CPC .............. F23R 3/286; F23R 3/283; F23R 3/28
See application file for complete search history.

(56) References Cited

U.S. PATENT DOCUMENTS

| 5,235,814 A * | 8/1993 | Leonard ................. F23R 3/283 60/738 |
| 8,894,407 B2 * | 11/2014 | Stoia ....................... F23R 3/286 431/12 |

(Continued)

*Primary Examiner* — Craig Kim
*Assistant Examiner* — Alyson Joan Harrington
(74) *Attorney, Agent, or Firm* — Hovey Williams LLP

(57) ABSTRACT

Gas turbine combustion systems and fuel cartridge assemblies are provided. An exemplary combustion system may comprise a combustor including one or more components, such as a cylindrical combustion liner, a flow sleeve, a main mixer, a radial inflow swirler, a combustor dome, and a fuel cartridge assembly. An exemplary fuel cartridge assembly may comprise first and second fuel manifolds which are connected to respective fuel circuits which supply fuel, such as liquid fuel, through a plurality of fuel passages within the fuel cartridge assembly or to other locations within an associated combustor. The fuel cartridge assembly may further include a plurality of fuel injector tips located at a tip plate of the fuel cartridge assembly through which fuel may be supplied to an associated combustor.

20 Claims, 24 Drawing Sheets

(51) Int. Cl.
   *F23R 3/44*    (2006.01)
   *F23R 3/54*    (2006.01)
   *F23R 3/20*    (2006.01)
   *F23R 3/00*    (2006.01)
   *F23R 3/14*    (2006.01)
   *F23R 3/36*    (2006.01)
   *F02C 7/22*    (2006.01)
   *F02C 7/232*   (2006.01)

(52) U.S. Cl.
   CPC .... *F05D 2220/32* (2013.01); *F05D 2230/237* (2013.01); *F05D 2260/14* (2013.01); *F05D 2260/30* (2013.01); *F05D 2260/99* (2013.01)

(56) References Cited

U.S. PATENT DOCUMENTS

| | | | | |
|---|---|---|---|---|
| 9,341,374 B2* | 5/2016 | Ramier | | F02C 3/22 |
| 9,528,444 B2* | 12/2016 | Westmoreland | | F02C 7/20 |
| 2006/0000395 A1* | 1/2006 | Joshi | | F23D 14/22 |
| | | | | 110/267 |
| 2006/0168966 A1* | 8/2006 | Stuttaford | | F02C 7/22 |
| | | | | 60/772 |
| 2011/0089267 A1* | 4/2011 | Stoia | | F02C 7/22 |
| | | | | 239/589 |
| 2013/0122434 A1* | 5/2013 | Stoia | | F23R 3/283 |
| | | | | 431/12 |
| 2016/0305668 A1* | 10/2016 | Romig | | F23R 3/343 |

* cited by examiner

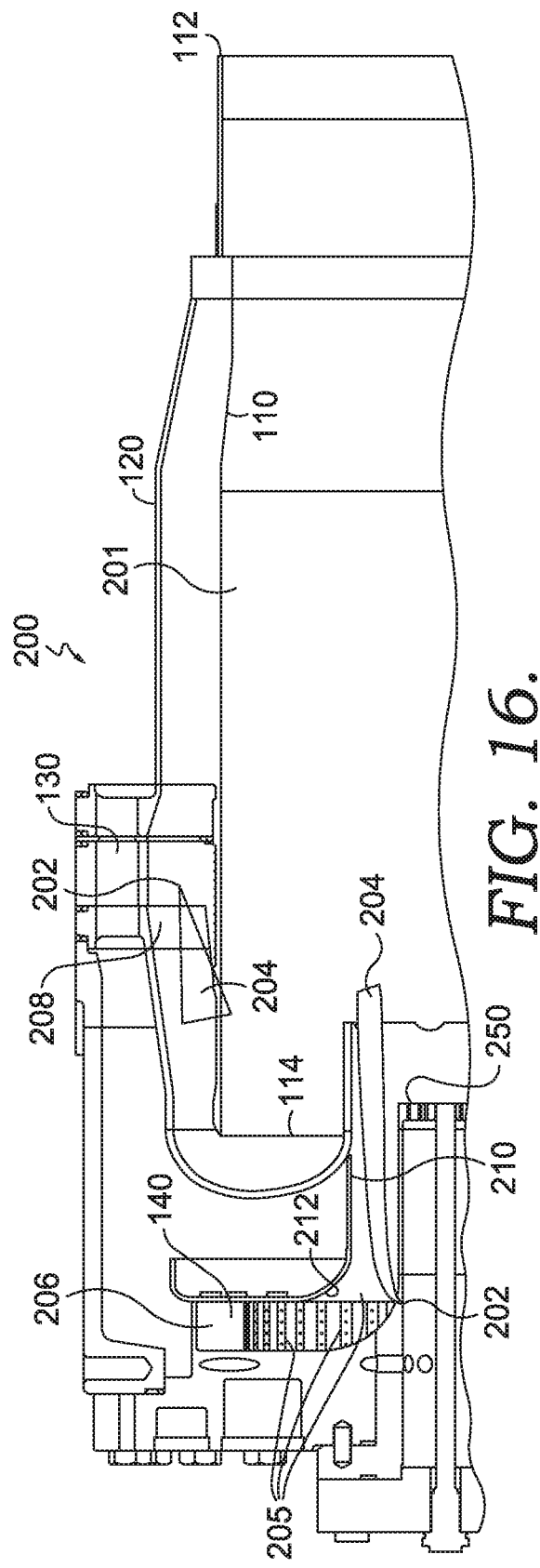
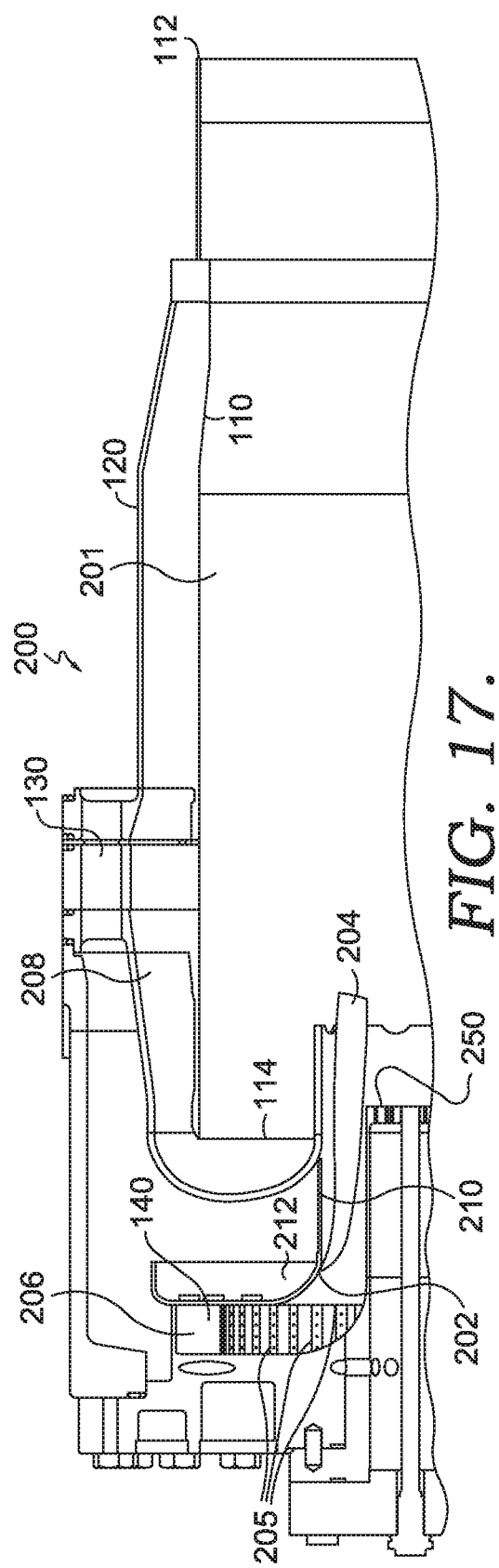

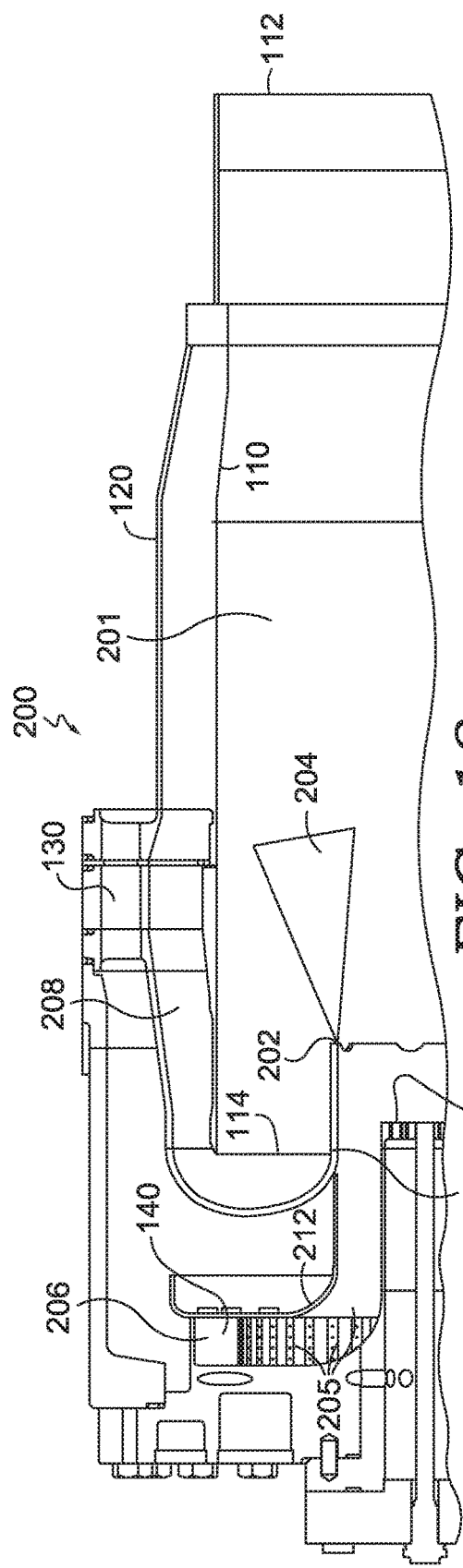
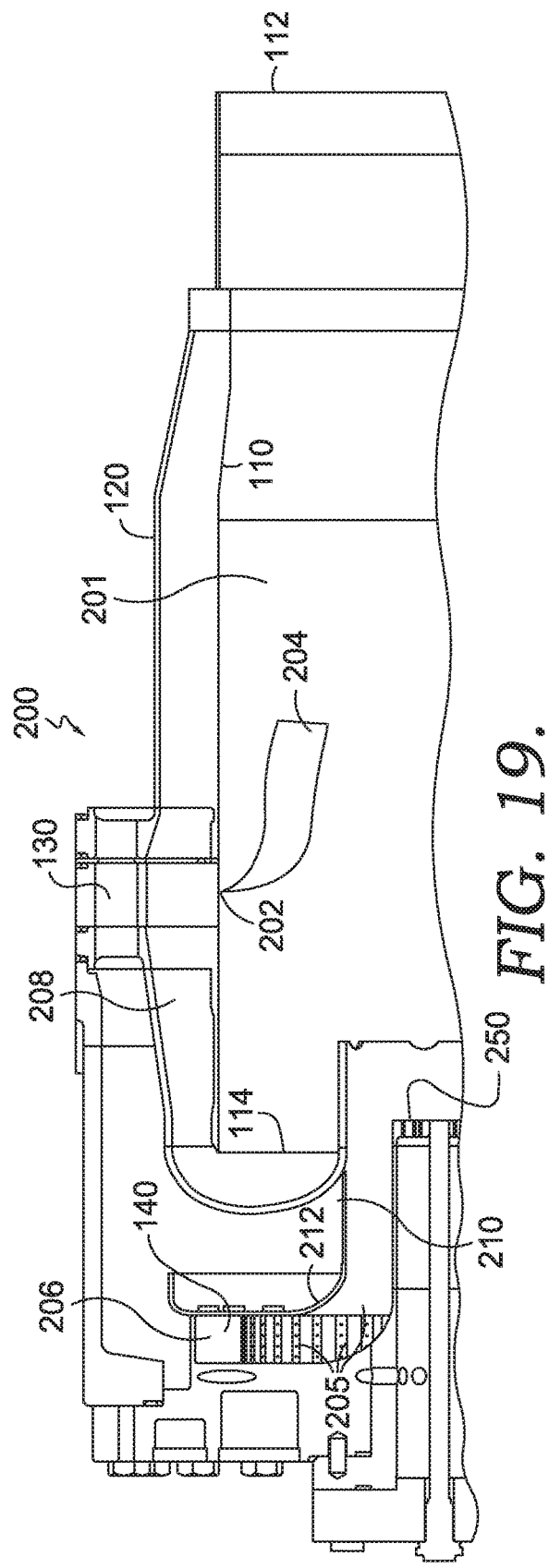

2700

2710
PROVIDING A COMBUSTION SYSTEM COMPRISING A CYLINDRICAL COMBUSTION LINER HAVING A CENTER AXIS, A FLOW SLEEVE COUPLED TO THE CYLINDRICAL COMBUSTION LINER AND LOCATED RADIALLY OUTWARD OF THE CYLINDRICAL COMBUSTION LINER RELATIVE TO THE CENTER AXIS, A MAIN MIXER COUPLED TO THE FLOW SLEEVE, A RADIAL INFLOW SWIRLER COUPLED TO THE CYLINDRICAL COMBUSTION LINER AND PROVIDING FLUID COMMUNICATION BETWEEN AN INSIDE AND AN OUTSIDE OF THE CYLINDRICAL COMBUSTION LINER, A COMBUSTOR DOME LOCATED AT AN END OF THE CYLINDRICAL COMBUSTION LINER, AND A FUEL CARTRIDGE ASSEMBLY COUPLED TO THE CYLINDRICAL COMBUSTION LINER AND EXTENDING AT LEAST PARTIALLY THROUGH THE RADIAL INFLOW SWIRLER ALONG THE CENTER AXIS

2720
COUPLING A FIRST FUEL CIRCUIT TO AT LEAST ONE OF THE FUEL CARTRIDGE ASSEMBLY, THE MAIN MIXER, AND THE RADIAL INFLOW SWIRLER

*FIG. 27.*

GAS TURBINE FUEL COMPONENTS

CROSS-REFERENCE TO RELATED APPLICATIONS

This application claims priority to U.S. Provisional Application No. 62/186,907, filed Jun. 30, 2015, and titled "Fuel Injection Locations Specific to Combustor Flow Path," the entire contents of which are incorporated herein by reference. This application is also related by subject matter to concurrently filed U.S. patent application Ser. No. 15/194,203, titled "Fuel Injection Locations Based on Combustor Flow Path," and concurrently filed U.S. patent application Ser. No. 15/194,213, titled "Gas Turbine Control System." Each of these related applications also claims priority to U.S. Provisional Application No. 62/186,907, their contents being incorporated herein by reference in their entirety.

TECHNICAL FIELD

The present technology relates generally to gas turbine combustors and fuel systems.

BACKGROUND OF THE INVENTION

Gas turbine engines produce emissions during use, which are often regulated, and as a result, gas turbine combustion systems are often tailored to ensure that emissions are maintained at an acceptable level. Emissions from a gas turbine combustor may be adjusted through variation in fuel injector location, airflow rates, air/fuel mixing, and/or fuel type (e.g., gas or liquid fuel), among other factors. Gaseous fuels may typically produce lower emissions than liquid fuels in gas turbine combustors, due to pre-mixing of the fuel and air, and the resulting completeness of combustion. However, some gas turbine operations are still suitable for using liquid fuel (e.g., diesel fuel, a fuel/water emulsion, oil, etc.) instead of gaseous fuel despite the relatively higher emissions. Factors such as fuel availability and emissions requirements may dictate use of such fuels. Accordingly, a gas turbine combustor that allows greater versatility in the type of fuel that may be used, among other benefits, is needed.

SUMMARY

A high-level overview of various embodiments of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, a dual-fuel combustion system for a gas turbine combustor that may allow operation of the combustor using either a gaseous fuel or a liquid fuel, in distinct or combined operation, in order to provide operational flexibility for the combustor with minimal transition of components and systems. The combustion system may include a variety of components, such as a cylindrical combustion liner, a main mixer, a radial inflow swirler, and a fuel cartridge assembly. Each of these components may further include various fuel injection locations configured to introduce liquid or gaseous fuel into the combustor, to provide a desired fuel source for combustion. Further, at least some of the fuel injection locations may be adjustable to supply liquid or gaseous fuel from an attached fuel circuit, depending on the desired fuel operation. Additionally, the fuel cartridge assembly may be provided in a combustor typically configured for gaseous fuel operation, and may be configured to provide liquid fuel through one or more fuel manifolds, to allow staging and emissions control of the combustor through delivery of fuel at least partially from the fuel cartridge assembly. Furthermore, operation of a gas turbine combustor and/or an associated fuel cartridge assembly may include controlling a flow of water, fuel, or a fuel and water mixture to different fuel circuits or a pilot fuel injector, among other components, to control a combustor profile and flame distribution, among other factors.

In one embodiment, a fuel cartridge assembly is provided. The assembly comprises a centerbody comprising an aft portion comprising at least a first fuel manifold and a second fuel manifold, a main body extending from the aft portion and having a first passageway contained therein, and a plurality of fuel passages extending axially from the aft portion to a tip plate. Each fuel passage of the plurality of fuel passages is in communication with the first fuel manifold or the second fuel manifold, and the tip plate is coupled to an end of the main body opposite the aft portion, the tip plate having at least one ignition opening and a plurality of openings corresponding to the plurality of axially extending fuel passages.

In another embodiment, a liquid fuel cartridge assembly is provided. The assembly comprises a centerbody comprising an aft portion comprising at least a first fuel manifold and a second fuel manifold, a main body extending from the aft portion and having a first passageway contained therein, and a plurality of fuel passages extending axially from the aft portion to a tip plate. Each fuel passage of the plurality of fuel passages is in communication with the first fuel manifold or the second fuel manifold, and the tip plate is coupled to an end of the main body opposite the aft portion, the tip plate having a plurality of openings corresponding to the plurality of axially extending fuel passages. The assembly further comprises a first outer sleeve coupled to the aft portion, and a second outer sleeve coupled and coaxial to the main body. The first and second outer sleeves are movable relative to each other.

In another embodiment, a combustion system for a gas turbine is provided. The system comprises a cylindrical combustion liner having a center axis, a flow sleeve coupled to the cylindrical combustion liner and positioned radially outward of the cylindrical combustion liner, and a main mixer coupled to the flow sleeve and positioned radially outward of the cylindrical combustion liner. The main mixer is configured to inject at least one of a gaseous and a liquid fuel into the cylindrical combustion liner. The system further comprises a combustor dome coupled to the flow sleeve and to the cylindrical combustion liner, and a radial inflow swirler coupled to the cylindrical combustion liner and providing fluid communication between an inside and an outside of the cylindrical combustion liner. The radial inflow swirler is configured to inject at least one of a gaseous and a liquid fuel into the cylindrical combustion liner. The system further comprises a fuel cartridge assembly comprising a centerbody, the centerbody comprising an aft portion comprising at least a first fuel manifold and a second fuel manifold, a main body extending from the aft portion and having a first passageway contained therein, and a plurality of fuel passages extending axially from the aft portion to a tip plate, each fuel passage of the plurality of fuel passages in communication with the first fuel manifold or the second fuel manifold, and the tip plate coupled to an end of the main body opposite the aft portion. The tip plate has at least one ignition opening and a plurality of openings corresponding to the plurality of axially extending fuel passages.

BRIEF DESCRIPTION OF THE SEVERAL VIEWS OF THE DRAWINGS

The present technology is described in detail with reference to the figures, which are exemplary and non-limiting in nature, wherein:

FIG. 16 depicts a partial cross-section view of a combustion system having liquid fuel injection capability, in accordance with an embodiment of the present technology;

FIG. 17 depicts the combustion system of FIG. 16 with a different fuel injection location, in accordance with an embodiment of the present technology;

FIG. 18 depicts the combustion system of FIGS. 16-17 with a different fuel injection location, in accordance with an embodiment of the present technology;

FIG. 19 depicts the combustion system of FIGS. 16-18 with a different fuel injection location, in accordance with an embodiment of the present technology;

FIG. 27 depicts a block diagram of an exemplary method of providing fuel injection locations based on combustor flow path, in accordance with an embodiment of the present technology;

DETAILED DESCRIPTION

At a high level, the present technology relates generally to a gas turbine combustion system capable of operating on liquid fuel and/or gaseous fuel to provide hot combustion gases to a turbine for power generation. Based on the type of gas turbine engine, fuel availability, and emissions requirements, different fuels may be supplied for producing the hot combustion gases. In this respect, each combustor of the gas turbine engine may include one or more fuel circuits and assemblies for supplying a selected fuel to the combustor. Additionally, the combustors may be configured to supply liquid or gaseous fuel, in combined or distinct operation, from one of multiple fuel injection locations. Additionally, a fuel cartridge assembly may include one or more fuel manifolds and may be coupled to the combustor to supply fuel for combustion, as will be described in greater detail below.

The applicant of the present technology has developed technology relating to gas turbine combustors, including: U.S. Pat. No. 6,935,116, entitled "FlameSheet Combustor;" U.S. Pat. No. 6,986,254, entitled "Method of Operating a FlameSheet Combustor;" U.S. Patent Application Publication No. 20140090390, entitled "FlameSheet Combustor Dome," U.S. Patent Application Publication No. 20150075172, entitled "FlameSheet Combustor Contoured Liner," U.S. Patent Application Publication No. 20140090396, entitled "Combustor with Radially Staged Premixed Pilot," and U.S. Patent Application Publication No. 20140090389, entitled "Variable Length Combustor Dome Extension for Improved Operability." Each of these referenced applications, publications, and patents are incorporated herein by reference in their entirety.

Figure 1:
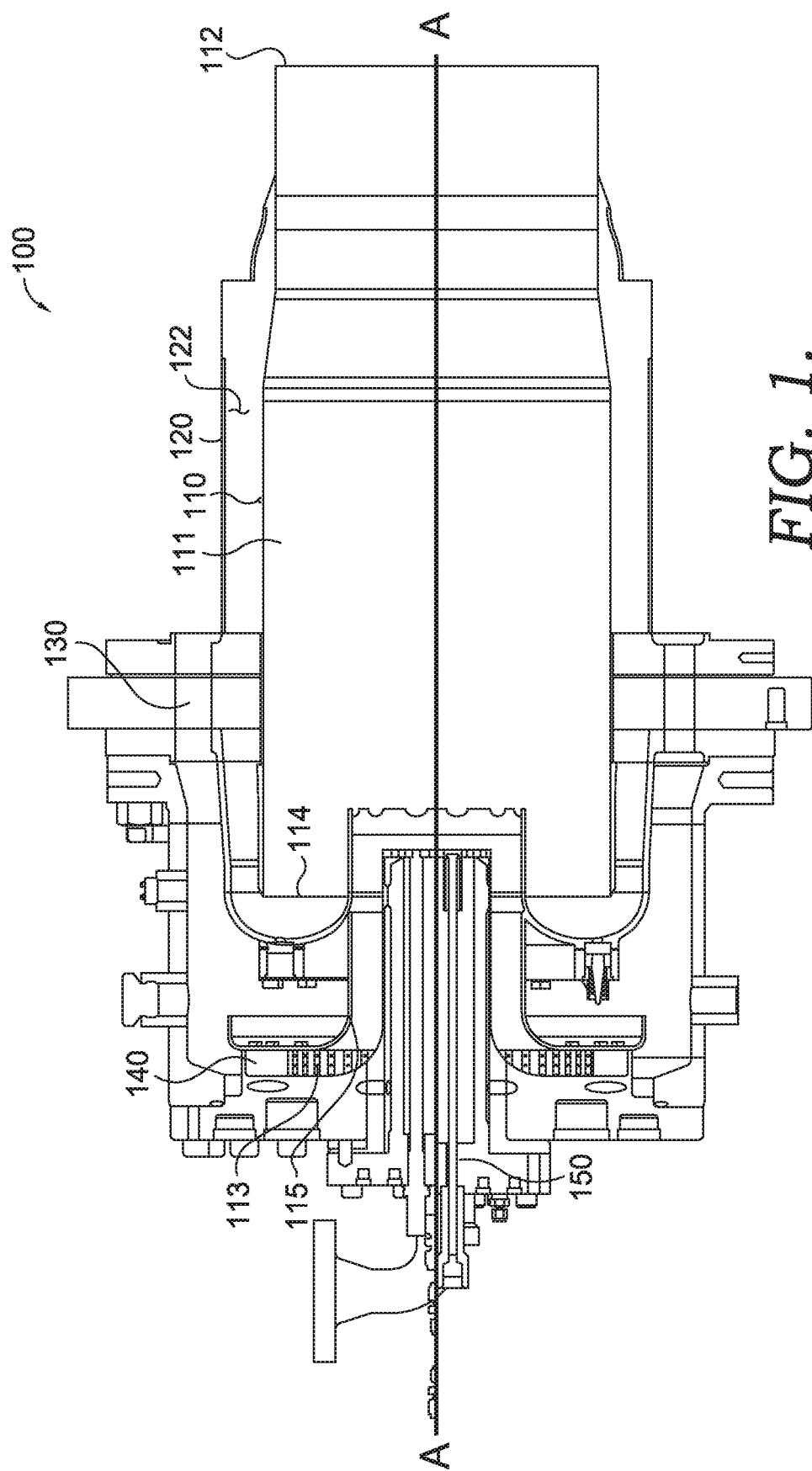
FIG. 1 is a cross-section view of a gas turbine combustion system, in accordance with an embodiment of the present technology.

Referring initially to FIG. 1, a combustion system 100 capable of operating on a gaseous or liquid fuel is provided. The combustion system 100 is discussed primarily with respect to liquid fuel operation, but may be configured for gaseous fuel operation as well. In this respect, various fuel injection locations in the combustion system 100 may be configured to supply fuel to a cylindrical combustion liner 110. The fuel may be liquid or gaseous fuel, depending on the connected fuel circuit. In this respect, at least some or all of the fuel injection locations may be configurable between liquid and gaseous fuel, to provide greater versatility in use of the combustor, with a limited transition of components or requirement for transition processes.

The combustion system 100 comprises the cylindrical combustion liner 110, which has a center axis A-A, and a flow sleeve 120 coupled to the cylindrical combustion liner 110 and positioned radially outward of the cylindrical combustion liner 110. The flow sleeve 120 at least partially surrounds the cylindrical combustion liner 110, forming a flow passage 122 through which compressed air may flow to cool an outer surface of the cylindrical combustion liner 110 as it travels to an inside of the cylindrical combustion liner. The compressed air flows from the aft end 112 of the cylindrical combustion liner 110 towards an inlet end 114 of the cylindrical combustion liner 110, where it may be mixed with fuel and injected into a combustion chamber 111 of the combustion liner 110 for ignition.

The combustion system 100 also includes a main mixer 130 coupled to the cylindrical combustion liner 110 and positioned adjacent the flow sleeve 120. The main mixer 130 shown in FIG. 1 is located radially outward of the cylindrical combustion liner 110 relative to the center axis A-A, and may be configured to inject a gaseous fuel and/or a liquid fuel into a passing flow of compressed air traveling through the flow sleeve 120. In this respect, the main mixer 130 may be coupled to a fuel circuit that supplies gaseous or liquid fuel, depending on the desired fuel operation. The main mixer 130 may also include one or more swirlers coupled thereto or integrate therein for imparting a swirl into passing air flow within the flow sleeve 120. This may provide greater turbulence in the passing air flow for enhanced fuel and air mixing. One or more fuel injectors may be coupled to the main mixer 130 and to any associated fuel circuits for injecting fuel into the flow sleeve 120 from the main mixer 130.

The combustion system 100 further comprises a radial inflow swirler 140 which may be used to direct a flow of compressed air, such as compressed air that is distinct from or the same as the compressed air passing through the flow sleeve 120, through a plurality of radially-oriented swirler vanes 113 and towards the cylindrical combustion liner 110. In this respect, the radial inflow swirler 140 provides fluid communication between an inside and an outside of the cylindrical combustion liner 110. One or more fuel injectors 115, which are coupled to one or more respective fuel circuits, may be attached to the swirler vanes 113 or to another part of the radial inflow swirler 140 for injecting a gaseous and/or liquid fuel into the swirler vanes 113 for passage into the cylindrical combustion liner 110. The fuel may be injected along a radial orientation relative to the center axis A-A or along an axial direction relative to the center axis A-A, or a combination thereof. As shown in FIG. 1, a flow of fuel and air passing through the swirler vanes 113 may travel from a radial direction to an axial direction relative to the center axis A-A as it travels to the cylindrical combustion liner 110. The fuel injectors 115 may each comprise at least a coupled fuel line and an injection valve.

Figure 22:
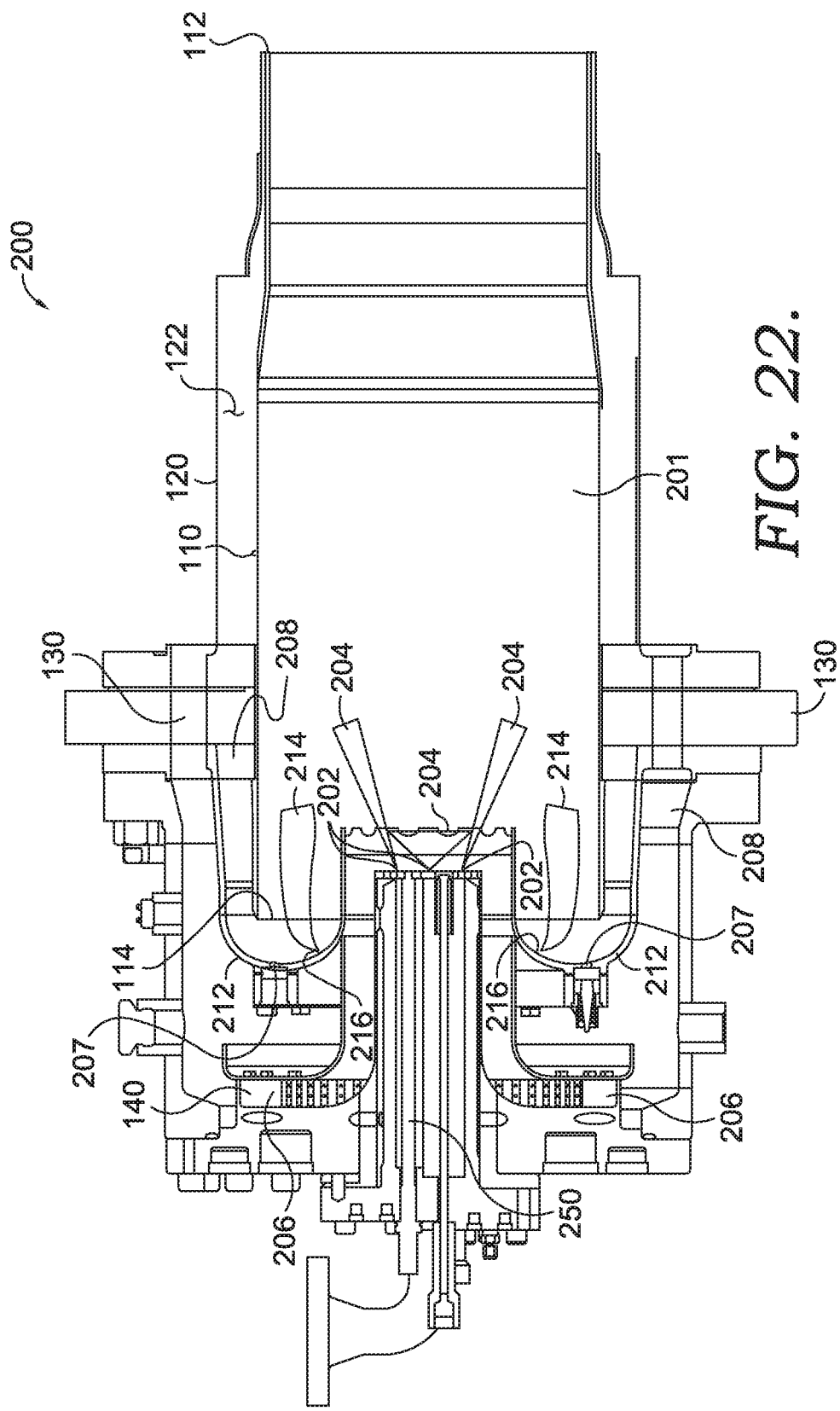
FIG. 22 depicts an exemplary combustor dome assembly, in accordance with an embodiment of the present technology.

In the combustion system 100 shown in FIG. 1, a fuel cartridge assembly 150 is coupled to the cylindrical combustion liner 110 and positioned generally along the center axis A-A of the combustion system 100. The fuel cartridge assembly 150 extends at least partially through the radial inflow swirler 140, and may be configured to inject liquid fuel into the combustion chamber 111. In this respect, as shown in FIG. 1 and FIGS. 16-19, liquid or gaseous fuel provided from a corresponding fuel circuit may be injected through the main mixer 130, the radial inflow swirler 140, a combustor dome 212 as depicted in FIG. 22, and/or through an alternate location, such as along the fuel cartridge assembly 150. These various fuel injection locations may allow premixing of air and fuel before subsequent ignition and combustion induced by a first main fuel circuit flame front. Premixing may serve to reduce the water needed for controlling emissions by reducing the local maximum achieved temperatures in the flame.

Figure 2:
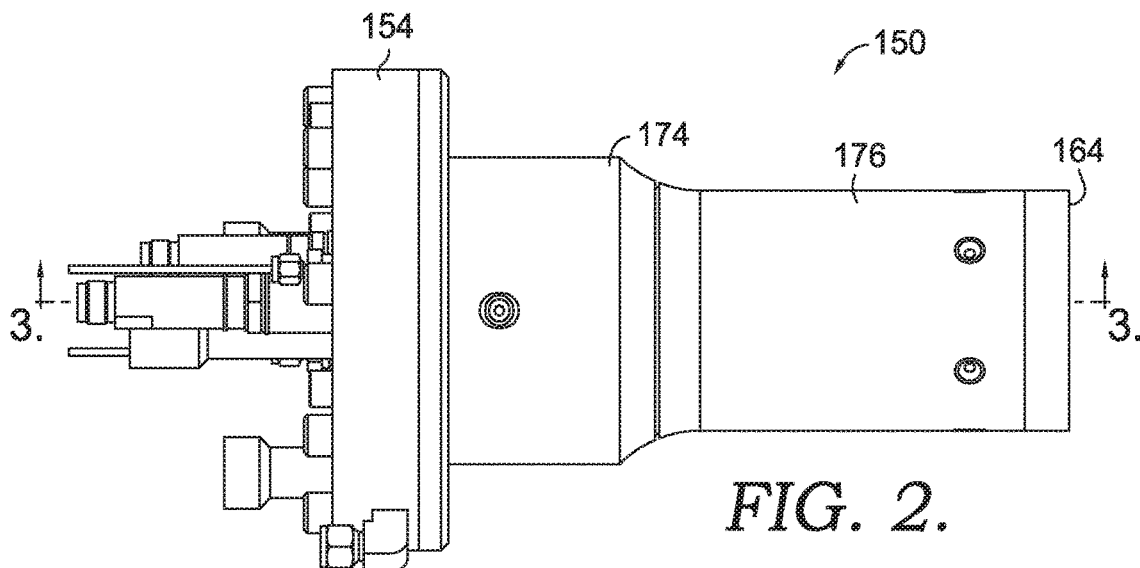
FIG. 2 is a side elevation view of a fuel cartridge assembly which may be used with the gas turbine combustion system of FIG. 1, in accordance with an embodiment of the present technology.
Figure 3:
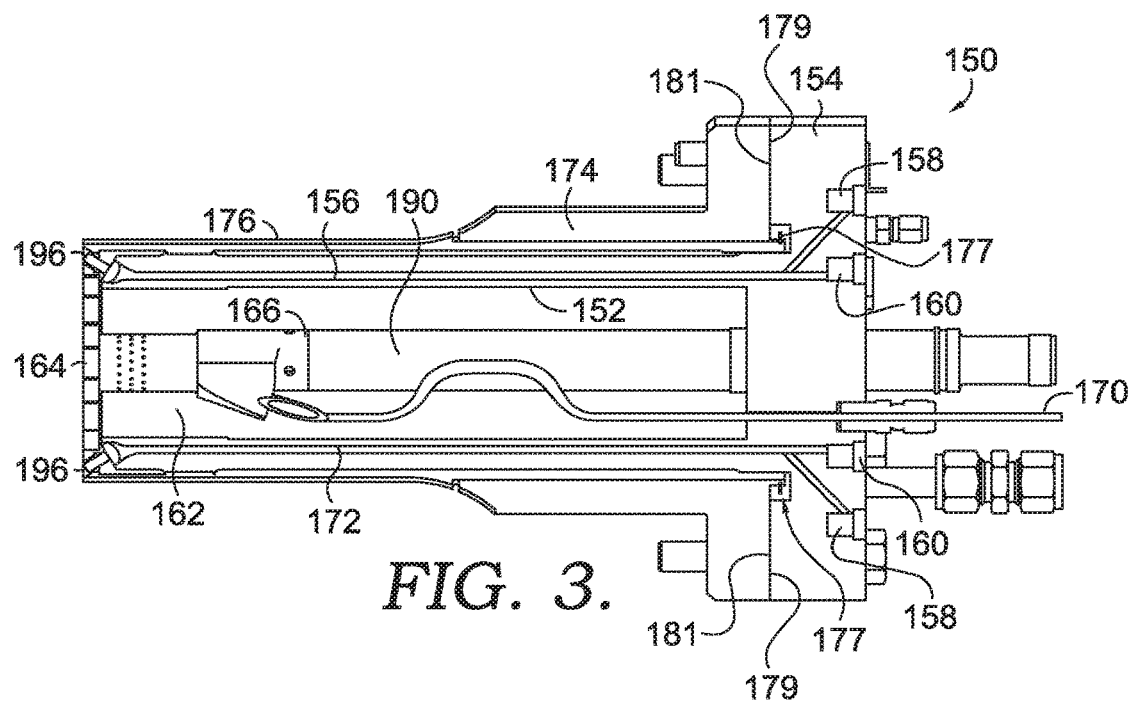
FIG. 3 is a cross-section view of the fuel cartridge assembly of FIG. 2 taken through a first main fuel circuit, in accordance with an embodiment of the present technology.

Referring to FIGS. 2-11B, details of the fuel cartridge assembly 150 are depicted and described in greater detail. FIG. 2 shows an outer housing of the fuel cartridge assembly 150 including a first outer sleeve 174 and a second outer sleeve 176 extending from an aft portion 154 of the fuel cartridge assembly 150. Further, as shown in FIG. 3, the fuel cartridge assembly 150 comprises a centerbody 152 including the aft portion 154 and a main body 156. The aft portion 154 extends radially to a larger diameter than the main body 156 and includes a first fuel manifold 158 and a second fuel manifold 160. The second fuel manifold 160 is located radially inward of the first fuel manifold 158. In alternate embodiments, the second fuel manifold 160 may be located radially outward of the first fuel manifold 158. The first fuel manifold 158 and the second fuel manifold 160 may provide a supply of fuel and/or a fuel/water emulsion through the fuel cartridge assembly 150 from one or more fuel and/or water circuits that are coupled to the fuel cartridge assembly 150. In this regard, the fuel and/or fuel/water emulsion may be supplied through axially extending fuel passages 172 that extend through the fuel cartridge assembly 150 to a plurality of fuel injector tips 196 at a tip plate 164. As shown in FIG. 3, the fuel injector tips 196 may be in fluid communication with the fuel passages 172, which are each in fluid communication with the first fuel manifold 158 or the second fuel manifold 160 to supply fuel through the fuel passages 172 (e.g., forming at least a portion of respective fuel circuits for the system 100). A fuel circuit may comprise a fuel source (e.g., a fuel supply line providing fuel and/or water), a fuel injector, and a respective fuel manifold, such as one of the fuel manifolds 158, 160 and their associated fuel passages 172 and fuel injector tips 196. A fuel circuit may also include other components such as valves, fuel storage receptacles, and other fuel manifolds or couplings that provide fluid communication for fuel supplies to a combustor.

It should be noted that the number and arrangement of the fuel injector tips 196 on the tip plate 164 may be varied to allow for varied fuel distribution from the fuel cartridge assembly 150. For example, the fuel passages 172, which are coupled to the first and second fuel manifolds 158, 160, may be arranged in an alternating radial configuration, or in another uniform or non-uniform configuration. In embodiments tailored for specific turbine operation, non-uniform configurations may be utilized as a dynamics reduction measure, or to create rich/lean combustion zones utilizing injector groupings. Additionally, each fuel injector tip 196 may include a channel that surrounds the fuel injector tip 196 for shielding air, to reduce or limit coking. The water-to-fuel ratio in each fuel circuit (e.g., provided through the first and second fuel manifolds 158, 160) may be varied from 0% water to 100% water, depending on the desired fuel/water mixture, if purging is desired to reduce or limit coking, and/or desired injection pressure, which in turn, affects fuel atomization in an associated combustor into which the fuel or fuel/water mixture is injected. In this regard, a higher fuel-to-water ratio may be used to delay evaporation and increase fuel penetration into an associated combustor. Different fuel circuits may also be utilized to produce different mixtures of fuel, water, and air within a combustor in concurrent or separate operation.

The fuel cartridge assembly 150 may include and utilize various types of pilot fuel injectors and main fuel injectors. Additionally, the fuel injector tips 196 may comprise a combination of simplex, duplex, plain-jet, and/or flat-fan fuel atomizers for injecting fuel into an associated combustion chamber. In this respect, for various combustor load conditions, each fuel circuit and its injector may be utilized for desired fuel burning and combustor operation. The fuel injector tips 196 on the fuel cartridge assembly 150 may be positioned radially towards the inside of the tip plate 164 or relatively further out towards the outer edge of the tip plate 164, or a combination thereof. A pilot or main fuel injector may comprise a single injector or multiple injectors located between a center and a perimeter of the tip plate 164 of the fuel cartridge assembly 150.

Figure 4:
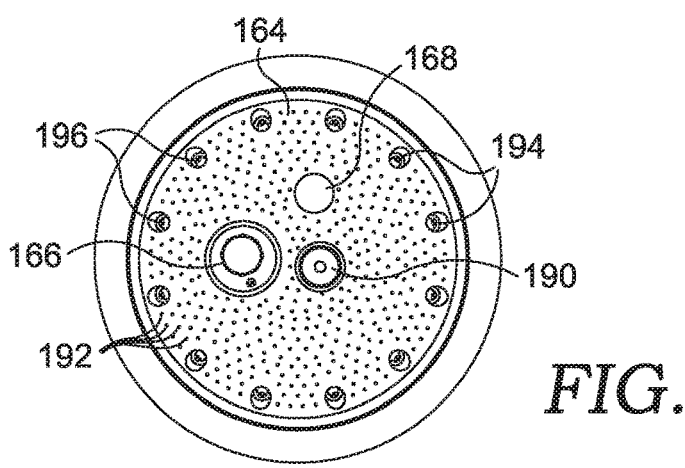
FIG. 4 is an end elevation view of a tip plate of the fuel cartridge assembly of FIG. 2, in accordance with an embodiment of the present technology.

As shown in FIG. 3, the main body 156 of the fuel cartridge assembly 150 comprises the centerbody 152 which extends axially from the aft portion 154 to the tip plate 164. The main body 156 has a first passageway 162 contained therein that may be pressurized with compressed air. The first passageway 162 may also contain one or more ignition systems extending through to the tip plate 164 for igniting fuel expelled from the tip plate 164. As shown in FIG. 4, exemplary ignition systems may include a torch igniter 166 and a spark igniter 168 coupled or positioned adjacent to the tip plate 164. Additional or alternative fuel ignition systems may be used as well, including those not shown in FIG. 4. The torch igniter 166 may be coupled to a natural gas fuel supply line 170 extending through the first passageway 162. One or multiple ignition systems, and flame points, may be provided at ignition openings in the tip plate 164 as needed for ignition of fuel supplied from the fuel cartridge assembly 150 or any other pilot ignition systems associated with the fuel cartridge assembly 150.

Figure 5:
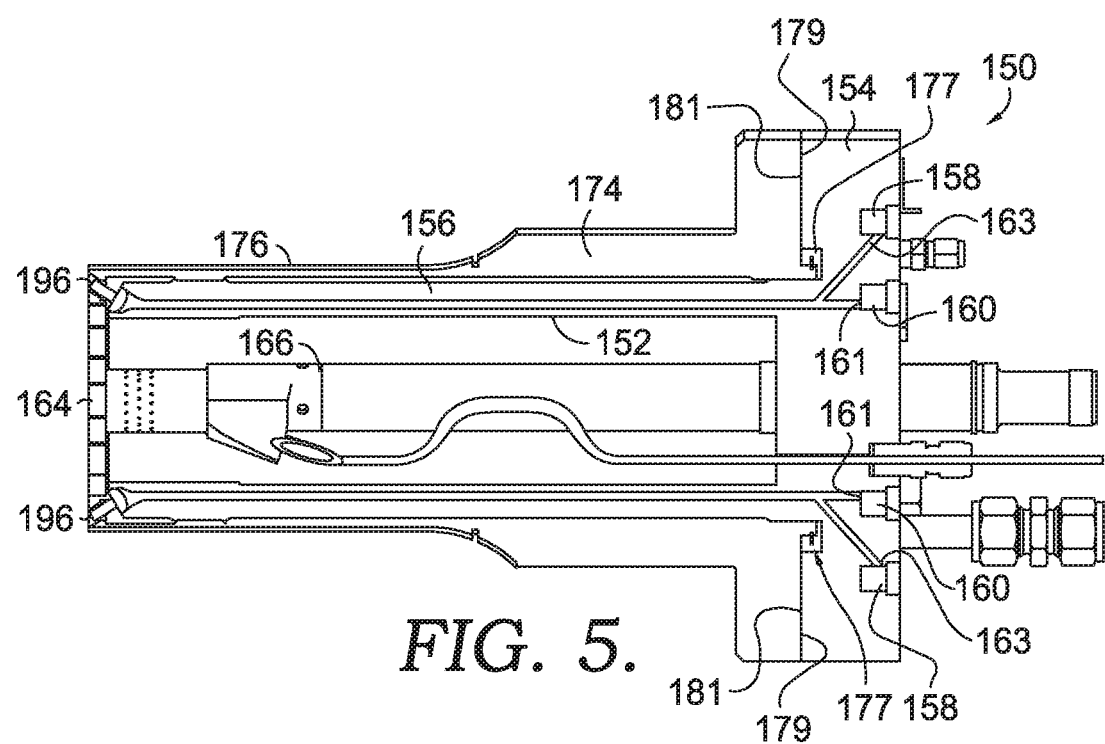
FIG. 5 is an alternate cross-section view of the fuel cartridge assembly of FIG. 2 taken through a second main fuel circuit, in accordance with an embodiment of the present technology.

As shown in FIGS. 3 and 5, a plurality of axially-extending fuel passages 172 are in fluid communication with the first fuel manifold 158 and the second fuel manifold 160 (e.g., some in communication with the first fuel manifold 158 and some in communication with the second fuel manifold 160). The number of fuel passages 172 in fluid communication with either the first fuel manifold 158 or the second fuel manifold 160 may vary depending on the amount of fuel to be supplied from each fuel circuit, or the desired radial fuel distribution on the tip plate 164. In one embodiment, the second fuel manifold 160 is located outside of the main body 156, such as on another area of the combustion system 100 (e.g., on the combustion liner 110) to allow for the various stagings of combustor operation.

Figure 7:
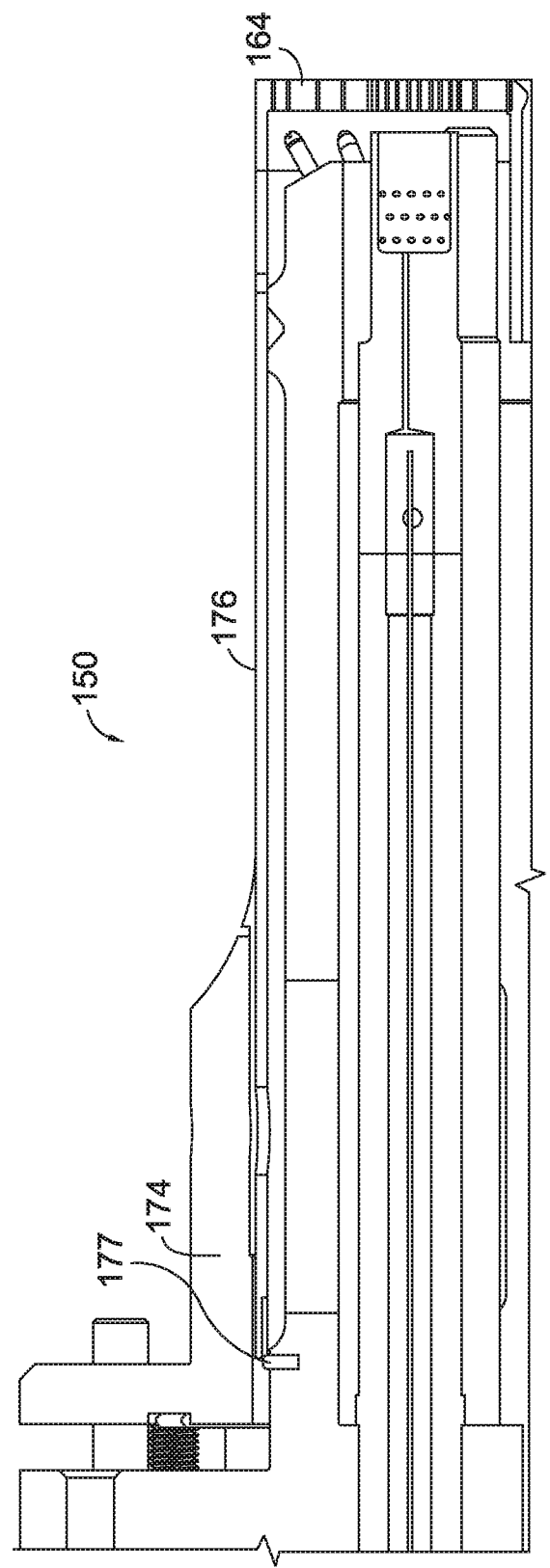
FIG. 7 is a cross-section view of a portion of the fuel cartridge assembly of FIG. 2, in accordance with an embodiment of the present technology.
Figure 8C:
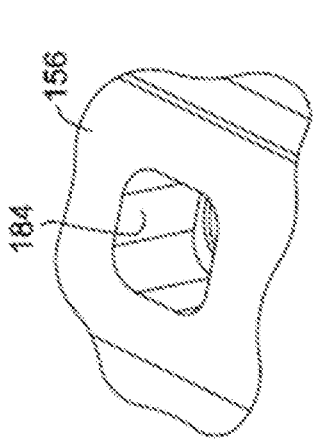
FIGS. 8A-8E show an angled, partial, cross-section view of a portion of the fuel cartridge assembly of FIG. 2, in accordance with an embodiment of the present technology.
Figure 8E:
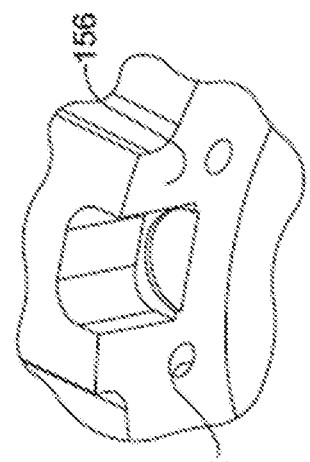
Figure 8B:
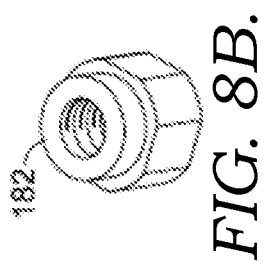
Figure 8D:
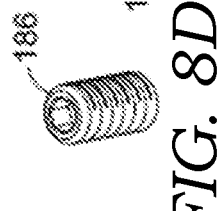
Figure 8A:
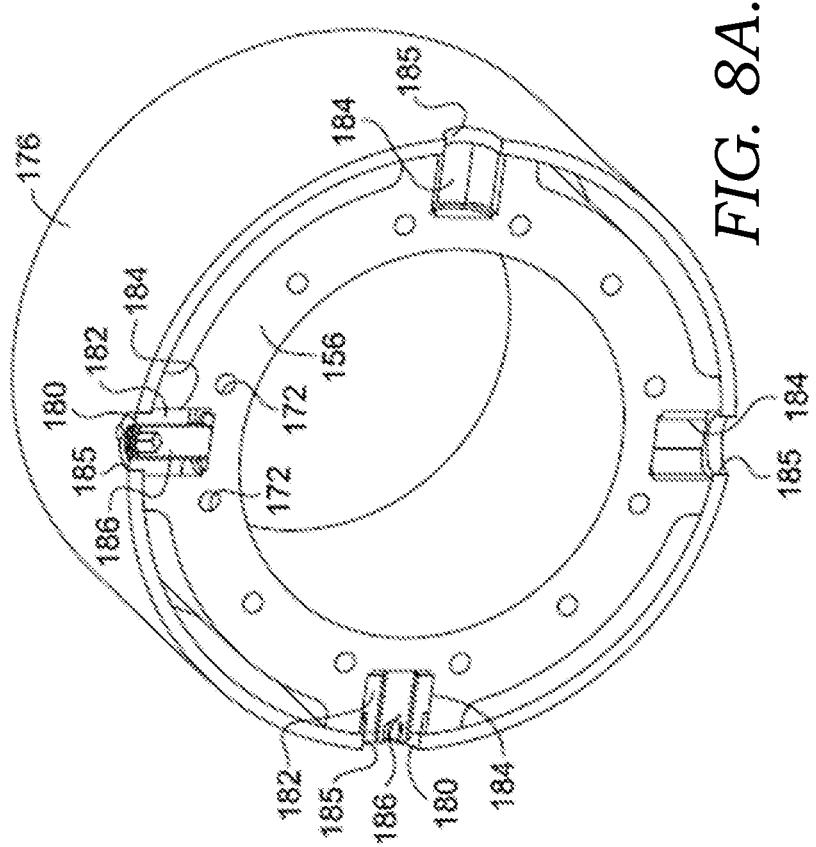

As shown in FIG. 3, a first outer sleeve 174 extends from the aft portion 154 and at least partially surrounds the centerbody 152. The fuel cartridge assembly 150 also comprises a second outer sleeve 176 that is coaxial to the main body 156. The second outer sleeve 176 is secured to the tip body 164, yet spaced relative to the first outer sleeve 174 such that the second outer sleeve 176 is capable of axial movement relative to the first outer sleeve 174. The spacing between the second outer sleeve 176 and the first outer sleeve 174 may be provided to allow for thermal gradient between first and second outer sleeves 174, 176. In other words, the spacing may provide a 360-degree thermal free-sliding joint for reducing thermal stress due to relative thermal growth in the fuel cartridge assembly 150 during operation of an associated combustor. The amount of thermal growth and/or movement of the second outer sleeve 176 may be controlled using the 360 degree thermal free-sliding joint to reduce possible structural failure while maintaining desired clearances to accommodate a desired fuel cartridge spray injection profile. Additionally, a fail-safe mechanism to prevent separation or undesired degrees of relative movement of the first and second outer sleeves 174, 176 may also be provided. This mechanism may be a retaining C-clip 177 coupled to the fuel cartridge assembly 150 adjacent an aft end 179 of the second outer sleeve 176, which can engage against an aft end 181 of the first outer sleeve 174, as depicted in FIGS. 3, 5, and 7.

Figure 6:
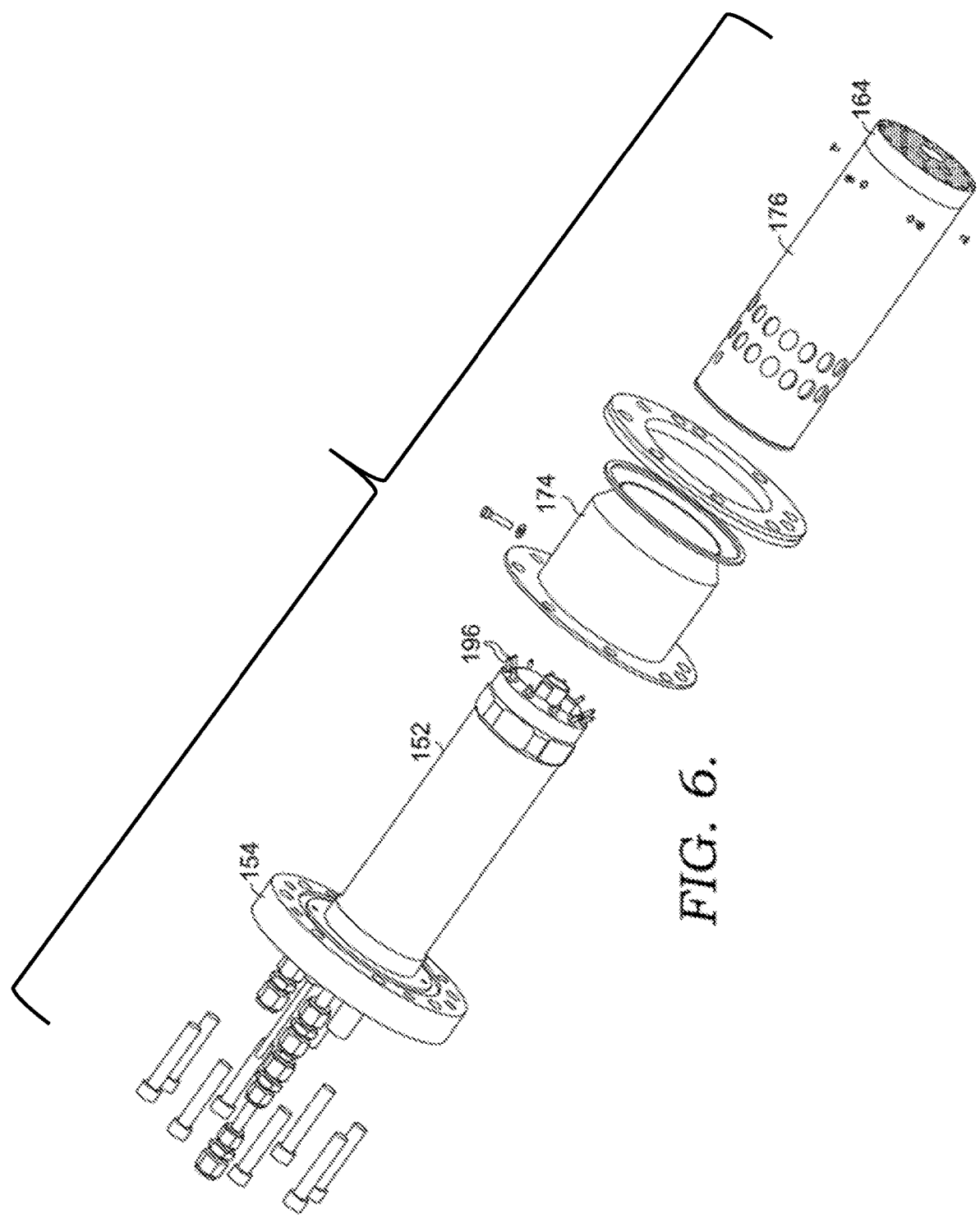
FIG. 6 is an exploded view of the fuel cartridge assembly of FIG. 2, in accordance with an embodiment of the present technology.

FIG. 6 depicts an exploded view of the fuel cartridge assembly 150, in accordance with an embodiment of the present technology. FIG. 6 shows the aft portion 154, the centerbody 152, the fuel injector tips 196, the first outer sleeve 174, the second outer sleeve 176, and the tip plate 164. FIG. 7 further depicts a partial cross-section view of the fuel cartridge assembly 150 with the first and second outer sleeves 174, 176 forming the thermal free-sliding joint and being retained by the C-clip 177.

Referring back to FIGS. 3 and 5, FIG. 3 depicts a cross-section view taken through a first main fuel circuit of the fuel cartridge assembly 150 and shows how fuel is configured to flow from the first fuel manifold 158 to the fuel passages 172 and towards the associated fuel injector tips 196 at the tip plate 164. In FIG. 3, fuel in the second fuel manifold 160 is at least partially obstructed or restricted from entering the fuel passages 172 coupled to the first fuel manifold 158. In this respect, the fuel from the second fuel manifold 160 is restricted or prevented from entering the fuel passages 172 in fluid communication with the first fuel manifold 158 using a series of plug welds or braze joints, which may be at or proximate fuel injection couplings 161, as shown in FIG. 5.

Referring to FIG. 5, a cross-section view of the fuel cartridge assembly 150 is shown taken through a second main fuel circuit. FIG. 5 shows how fuel flows from the second fuel manifold 160 to coupled fuel passages 172 and towards the associated fuel injector tips 196 at the tip plate 164. In FIG. 5, the fuel in the first fuel manifold 158 is at least partially obstructed or restricted from entering the fuel passages 172 that are in fluid communication with the second fuel manifold 160. The fuel may be restricted or prevented from entering the fuel passages 172 in fluid communication with the second fuel manifold 160 using a series of plug welds or braze joints, which may be at or proximate fuel injection couplings 163, as shown in FIG. 5. By selectively blocking fuel to the fuel passages 172 in a circumferential and/or alternating pattern about the fuel cartridge assembly 150, staging and selected fuel spray patterns may be tailored to achieve desired combustion operational targets.

Referring to FIGS. 8A-9F, further depictions of how the second outer sleeve 176 may be secured to the main body 156 of the fuel cartridge assembly 150 are provided. FIGS. 8A-8E show an angled, partial, cross-section view of the fuel cartridge assembly 150 of FIGS. 3 and 5, with a plurality of removable fastener systems 180 for coupling the second outer sleeve 176 to the main body 156. Each of the plurality of removable fastener systems 180 may comprise at least a locking insert 182 that is sized to fit within a respective opening 184 in the main body 156, and a set screw 186. For the embodiment depicted in FIGS. 8A-9F, four removable fastener systems 180 are used to secure the second outer sleeve 176 to the main body 156, but more or fewer fastener systems 180 may be utilized, including at different locations, in addition to alternative fastener systems.

Figure 9A:
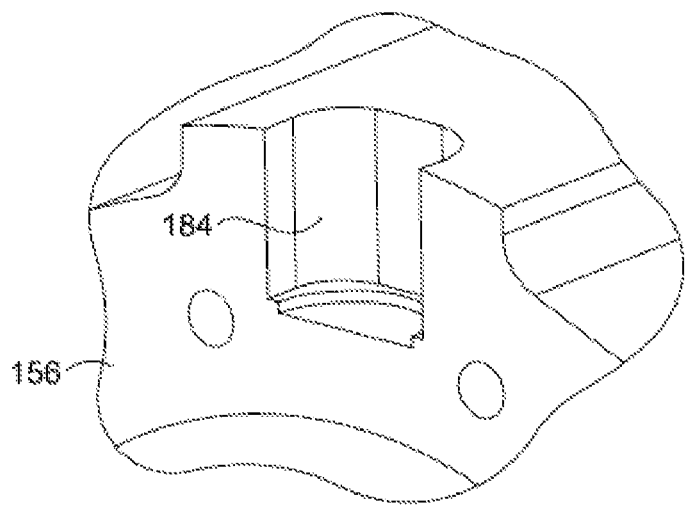
FIGS. 9A-9F are a series of diagrams depicting how a centerbody of a fuel cartridge assembly may be removably secured to an outer sleeve, in accordance with an embodiment of the present technology.
Figure 9B:
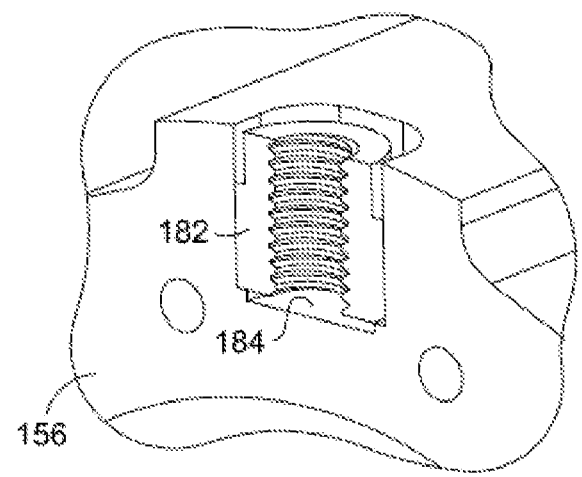
Figure 9C:
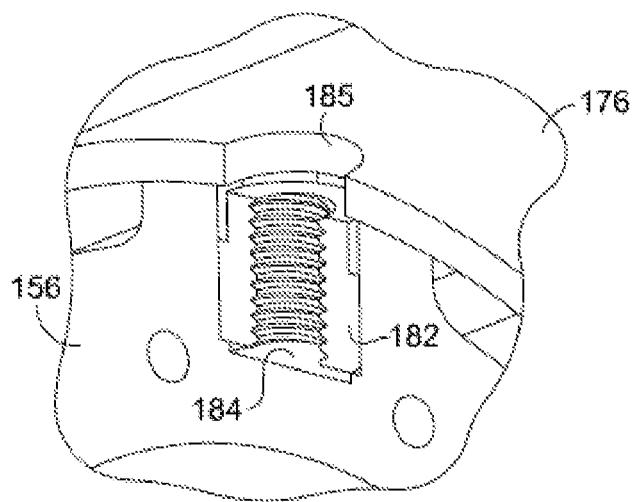
Figure 9D:
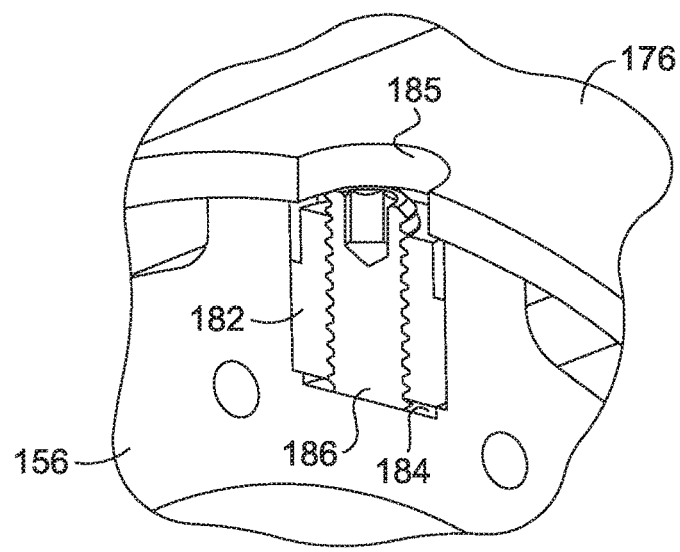
Figure 9E:
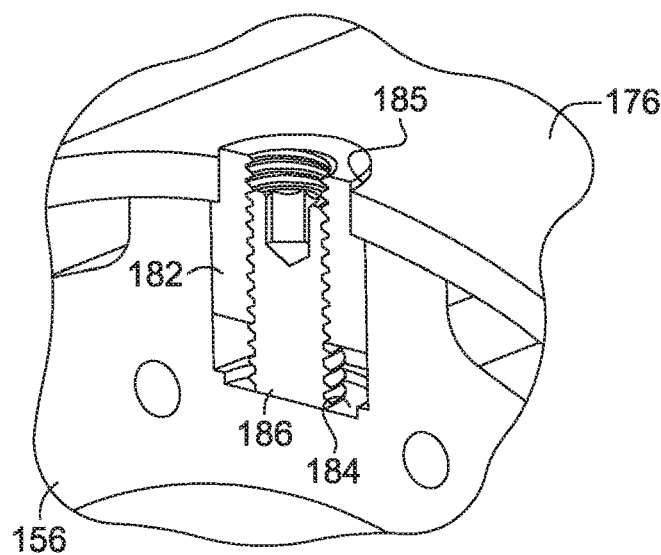
Figure 9F:
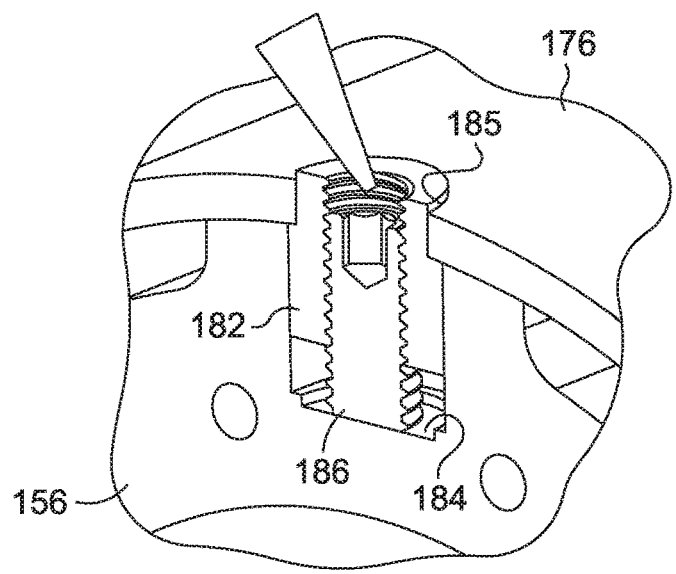

A process of securing the second outer sleeve 176 to the main body 156 is shown in more detail in FIGS. 9A-9F. To secure the second outer sleeve 176 to the main body 156, the locking inserts 182 may first be placed in openings 184 in the main body 156. The second outer sleeve 176 may then be slid over the main body 156 such that openings 185 in the second outer sleeve 176 align with the openings 184 in the main body 156. A set screw 186 may then be inserted into the locking insert 182 and subsequently tightened to allow the locking insert 182 to lift up along the threads of the set screw 186 to engage the second outer sleeve 176 (i.e., apply a force by countersinking). As a result, a coupling force may then be provided that secures the second outer sleeve 176 to the main body 156 in a removable manner, as depicted in FIG. 9E. Finally, the threads of the set screw 186 may be staked, as shown in FIG. 9F, in order to prevent or restrict undesired rotational movement of the set screw 186. Additionally, the locking insert 182 and the set screw 186 may be machined (e.g., plug welded and flush ground) to provide a smooth surface contour across the second outer sleeve 176. Tack welds may also be applied to any number of the removable fastener systems 180, and in addition, several of the removable fastener systems 180 may be provided without the tack welds, so that with each round or series of operation of the combustion system 100, the wear and degradation of the removable fastener systems 180 may be analyzed by examining any non-tack welded fasteners, for lifecycle examination purposes.

Referring back to FIGS. 3 and 4, in order to initially ignite the fuel cartridge assembly 150, a pilot fuel injector 190 may be utilized. As shown in FIGS. 3-4, the pilot fuel injector 190 passes axially through the first passageway 162 of the main body 156 to the tip plate 164. The pilot fuel injector 190 may be used to provide a dedicated source of fuel to establish a flame by way of the torch igniter 166 and/or the spark igniter 168, shown in FIG. 4. Fuel flow to the pilot fuel injector 190 may be may be maintained or regulated to help maintain a steady flame presence.

As shown in FIG. 4, the pilot fuel injector 190, the torch igniter 166, and/or the spark igniter 168 are exposed at the tip plate 164. The tip plate 164 may be secured to the second outer sleeve 176, such as with a welding or brazing process. In FIG. 4, the tip plate 164 includes three openings located near the center axis A-A of the combustion system 100, one for each of the torch igniter 166, the spark igniter 168, and the pilot fuel injector 190. Provided on the tip plate 164 are a plurality of air holes 192 for directing compressed air through the tip plate 164 to help maintain the temperature of the tip plate 164 during operation. The air injection holes 192 may be oriented axially (i.e., parallel to the first passageway 162) or at an angle relative to the surface of the tip plate 164 so as to impart a swirl to the air passing through the tip plate 164. The tip plate 164 shown in FIG. 4 also includes a plurality of openings 194 corresponding to the plurality of axially-extending fuel passages 172. Located within each of the plurality of openings 194 is a fuel injector tip 196, such as one of those shown in FIGS. 3, 10A-10B, and/or 11A-11B, that is coupled to a respective fuel passage 172.

Figure 10A:
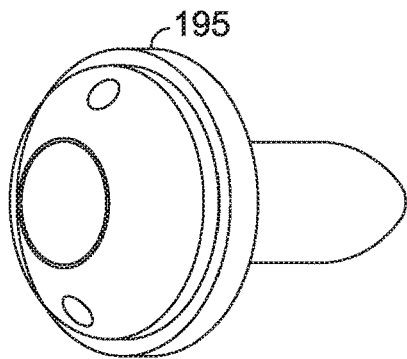
FIGS. 10A-10B depict a pressure swirl atomizer nozzle which may be used with a fuel cartridge assembly, in accordance with an embodiment of the present technology.
Figure 10B:
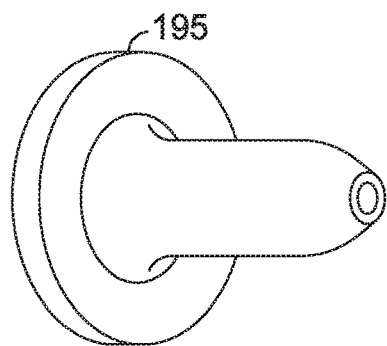
Figure 11A:
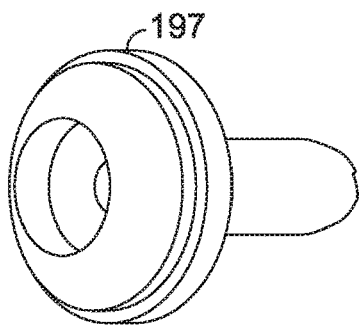
FIGS. 11A-11B depict a flat fan nozzle which may be used with a fuel cartridge assembly, in accordance with an embodiment of the present technology.
Figure 11B:
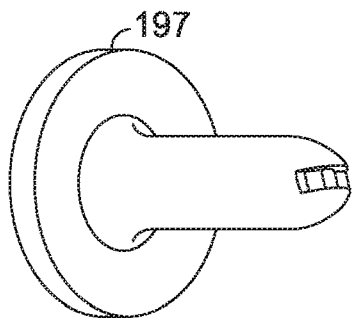
Figure 11C:
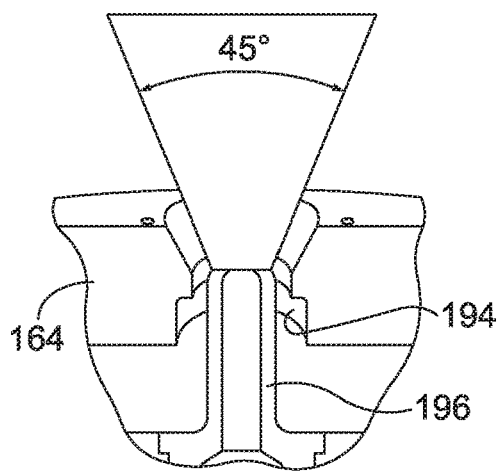
FIGS. 11C-11D depict an exemplary positioning of a fuel injector tip for use with a fuel cartridge assembly, in accordance with an embodiment of the present technology.
Figure 11D:
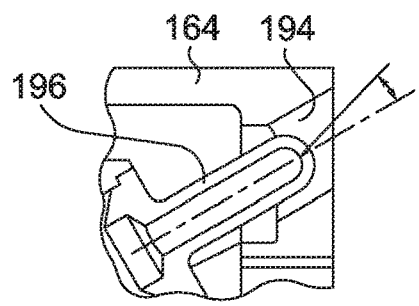

Referring to FIGS. 10A-11D, a variety of exemplary fuel injector tips for use with a fuel cartridge assembly is provided. Each fuel injector tip 196 of the fuel cartridge assembly 150 shown in FIGS. 3 and 5 may comprise one of a number of tips that provide different fuel distributions, such as a pressure swirl atomizer (PSA) nozzle 195 as shown in FIGS. 10A and 10B, or a flat fan nozzle 197, as shown in FIGS. 11A and 11B. By varying the type of nozzle used with the fuel cartridge assembly 150 (e.g., by selecting the PSA nozzle 195 or the flat fan nozzle 197, or another nozzle) the dispersion of fuel can be varied. The fuel injector tips 196 may be inclined relative to a combustor axis radially and/or tangentially to improve mixing, droplet distribution, and burnout in a combustion chamber. This is shown in the exemplary arrangements of the fuel injector tips 196 depicted in FIGS. 11C-11D. In FIG. 11C, the fuel injector tip 196 is positioned in an opening 194 of the tip plate 164 orthogonally, or rather, perpendicular to the orientation of the tip plate 164. In FIGS. 11C-11D, the fuel injector tip 196 is angled relative to the tip plate 164, and the fan-type nozzle provides a 45° dispersion of the fuel from the fuel injector tip 196 relative to the orientation of the tip plate 164. Different fuel tip types, with varying dispersion patterns, may be used and arranged into different configurations with different outlet angles on the tip plate 164 to achieve optimal dispersion in an associated combustor.

Additionally, the placement or orientation of fuel injector tips in a tip plate, such as the injector tips 196 in the tip plate 164 shown in FIGS. 11C-11D, may not be fixed. Rather, instead of fixedly coupling the injector tips 196 to the tip plate 164, the injector tips 196 may be inserted at least partially within, or extended at least partially through, the openings 194 in the tip plate 164, such that movement of the tip plate 164 relative to the injector tips 196 is permitted. In this regard, the movement of the tip plate 164 relative to the injector tip 196 may allow the fuel dispersion from the injector tip to be less affected by thermal expansion and contraction of the tip plate 164 during operation of an associated combustor. By having a loose or free-floating positioning of the fuel injector tips 196 in tip plate 164, a steady fuel distribution pattern from injector tip 196 within or proximate to the openings 194 may be provided.

Figure 24:
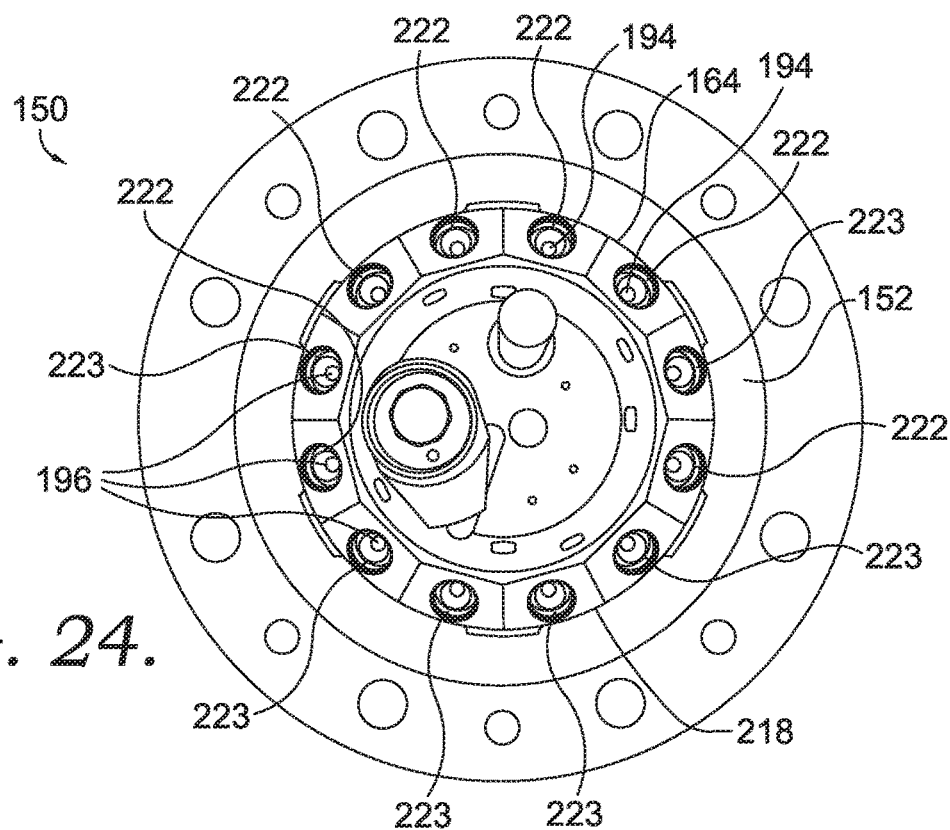
FIG. 24 depicts a second configuration of a centerbody of a fuel cartridge assembly, in accordance with an embodiment of the present technology.

Depending on the desired spray pattern from the fuel cartridge assembly 150, the plurality of openings 194 in the tip plate 164 may include all flat fan nozzles 222, all PSA nozzles 223, or a combination thereof, as shown in FIG. 24, and/or one or more nozzles of an alternate configuration. The fuel injector tips 196, as well as the spray pattern utilized, may vary circumferentially or radially about the tip plate 164 to create a desired stage spray pattern profile, or a section-based staged spray pattern profile. Additionally, as shown in FIGS. 3 and 4, each fuel injector tip 196 may be at least partially circumscribed by a dedicated opening 194 within the tip plate 164 to allow a continuous flow of shielding air fed by the first passageway 162 to surround each respective fuel injector tip 196. The shielding air may be utilized to sweep remaining oil residue from the nozzle, and may be used to prevent or reduce nozzle coking or clogging during operation and shutdown.

Figure 23:
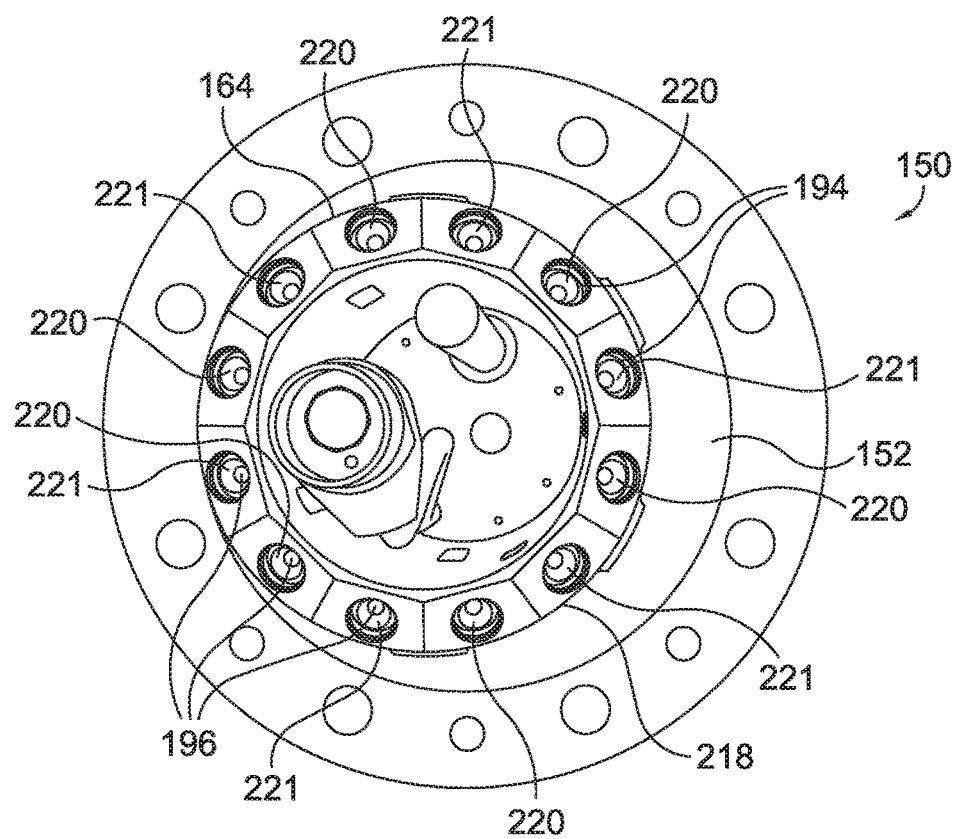
FIG. 23 depicts a first configuration of a centerbody of a fuel cartridge assembly, in accordance with an embodiment of the present technology.

Referring to FIGS. 23 and 24, an inner view of the fuel cartridge assembly 150 at an aft portion 154 of the centerbody 152 is provided, in accordance with an embodiment of the present technology. Depending on the amount of liquid fuel to be supplied to the different stages of the combustion system 100, the number of fuel passages 172 in communication with the first fuel manifold 158 compared to the number of fuel passages 172 in communication with the second fuel manifold 160 may vary for optimization of flame stability during loading, exit temperature distribution, liner coking, combustion dynamics, and/or emission controls. For example, in one embodiment, there can be an equal number of fuel passages 172 connected to the first fuel manifold 158 and to the second fuel manifold 160, as shown by main 1 fuel stage 220 and main 2 fuel stage 221 depicted in FIG. 23 (main 1 fuel stage 220 may be associated with the first fuel manifold 158 and main 2 fuel stage 221 may be associated with the second fuel manifold 160). Alternatively, there may be a greater number of fuel passages 172 connected to the first fuel manifold 158 or to the second fuel manifold 160. These fuel passages 172, which may be associated with the first and the second fuel manifolds 158, 160, may be arranged with a circumferential and/or radial variation to further optimize droplet distribution and combustion dynamics control as required for operational conditions.

Figure 12:
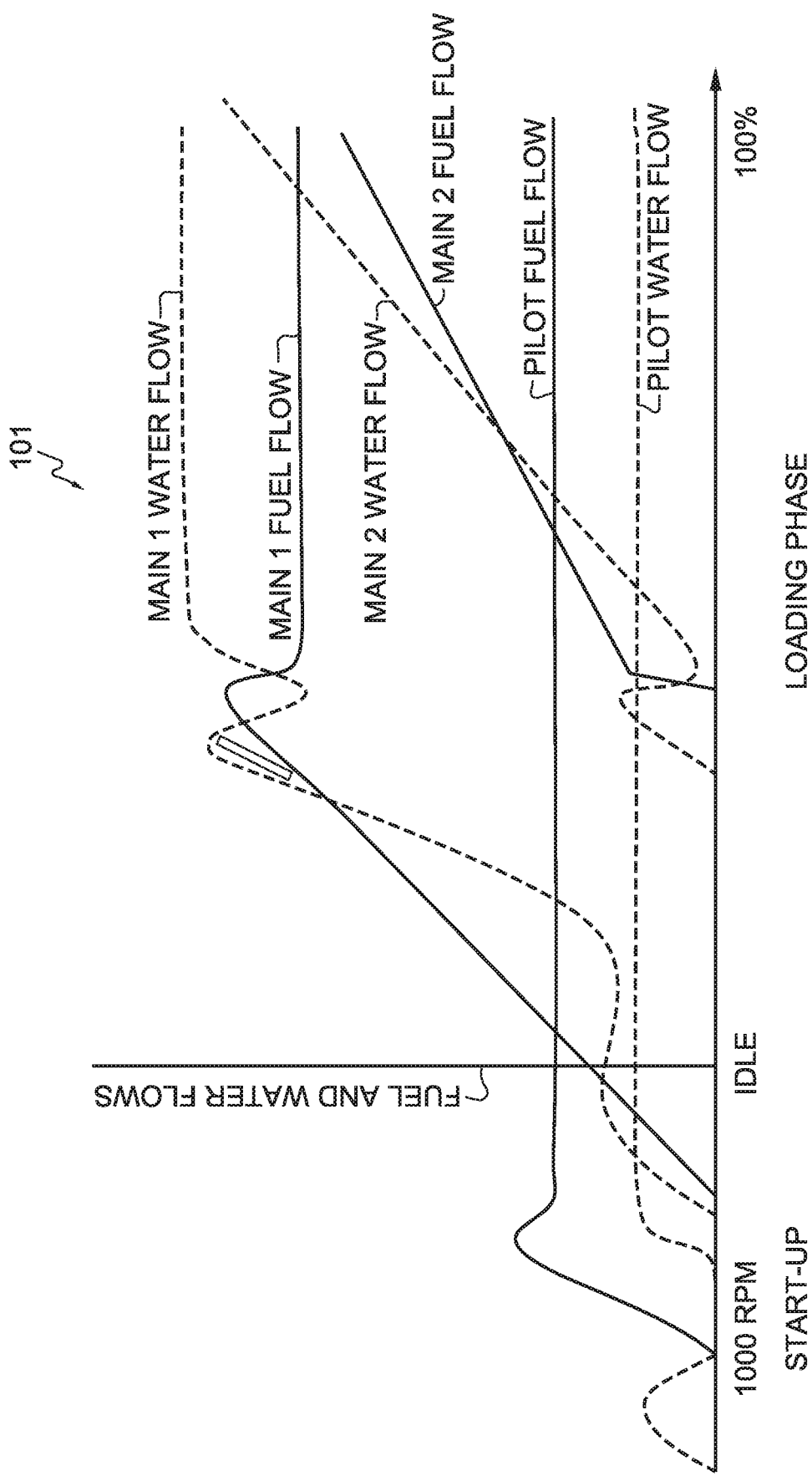
FIG. 12 depicts a staging process for liquid fuel and water circuits in a combustion system, in accordance with an embodiment of the present technology.
Figure 13:
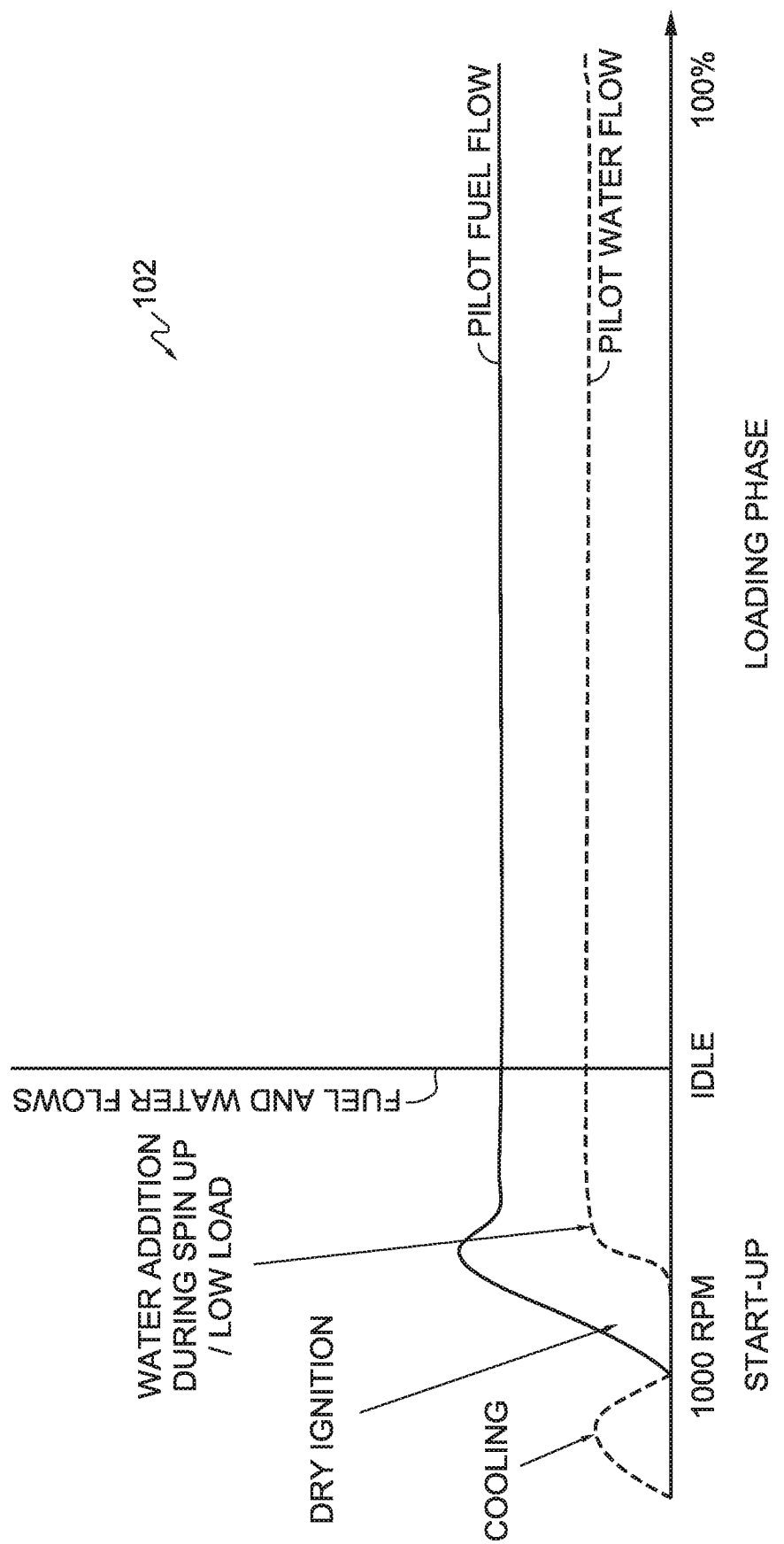
FIG. 13 depicts a staging process for a pilot fuel and water circuit in a combustion system, in accordance with an embodiment of the present technology.

Referring now to FIGS. 12-15, a series of control curves 101, 102, 103, and 104 are provided for identifying relative liquid fuel and water flows for each stage of a combustion system as an engine load is increased. For example, FIG. 12 depicts a control curve for two fuel circuits (e.g., main 1 and main 2 fuel circuits) with respect to an increase in engine load, while FIG. 13 depicts a pilot injector fuel and water flow relative to the engine load. The pilot injector may be utilized as an ignition circuit and as a flame stabilizing source for fuel injection from the first and/or the second main fuel circuits of a fuel cartridge assembly, such as the fuel cartridge assembly 150 shown in FIGS. 3 and 5.

In FIG. 13, a water flow is initiated to initially purge the pilot injector to remove any residual fuel that may be present. As water flow to the pilot injector is reduced, liquid fuel flow to the pilot injector may be increased, resulting in pilot ignition by one of the ignition systems (e.g., torch igniter, spark igniter). Ignition may be achieved by igniting fuel or fuel in a fuel-water emulsion by an igniter. Subsequently, water may be added to the fuel flow to form an emulsion with the water added during spin-up and low load of the gas turbine engine. The fuel and water may then be leveled off to a steady state condition and remain steady as the load on the gas turbine is increased.

Figure 14:
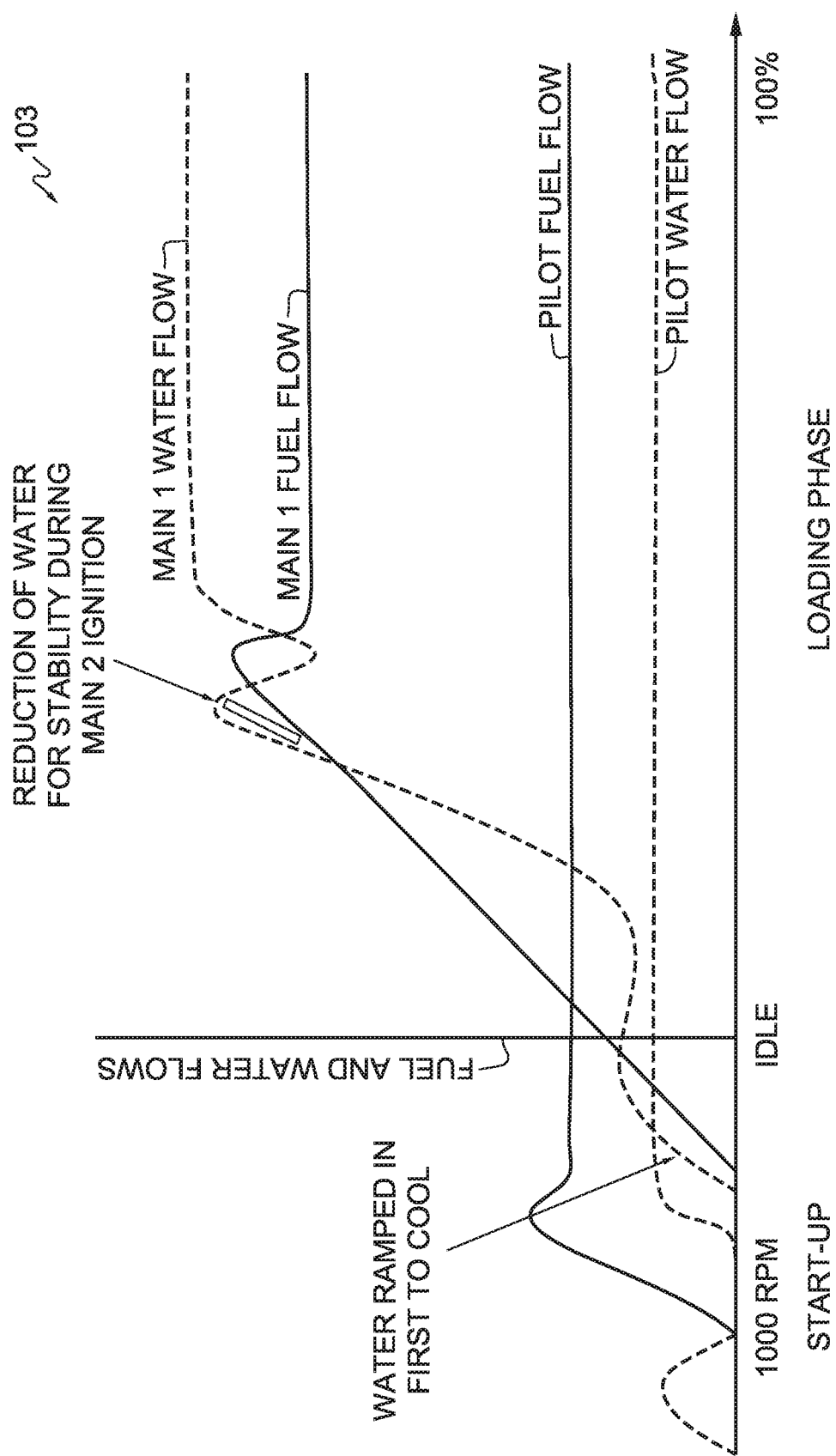
FIG. 14 depicts a staging process for a first main fuel and water circuit and a pilot fuel and water circuit in a combustion system, in accordance with an embodiment of the present technology.

Referring now to FIG. 14, overlaid on the pilot fuel and water flow curves in FIGS. 12-13 is the flow of fuel and water to a first main fuel circuit (i.e., main 1, which may be provided by the first fuel manifold 158 shown in FIG. 3). With respect to the first main fuel circuit, once ignition has occurred with the pilot injector, water flows initially to the first main fuel circuit in order to purge the first main fuel circuit. Then, liquid fuel supply is increased to create an emulsion with fuel and water becoming more balanced as the load is increased. As a result, a combustor exit temperature profile and pressure requirements of the pilot system may be controlled in a manner which may create a more uniform exit temperature profile and reduce coking. The amount of fuel and water supplied to the fuel circuit may generally increase up until the point of a second main fuel circuit ignition, after which the amount of fuel flow and water flow to the first main fuel circuit may be leveled off. Specific fuel flow and water flow rates may vary depending on a variety of gas turbine engine operating characteristics, and in general are not limited in nature to those described herein.

Figure 15:
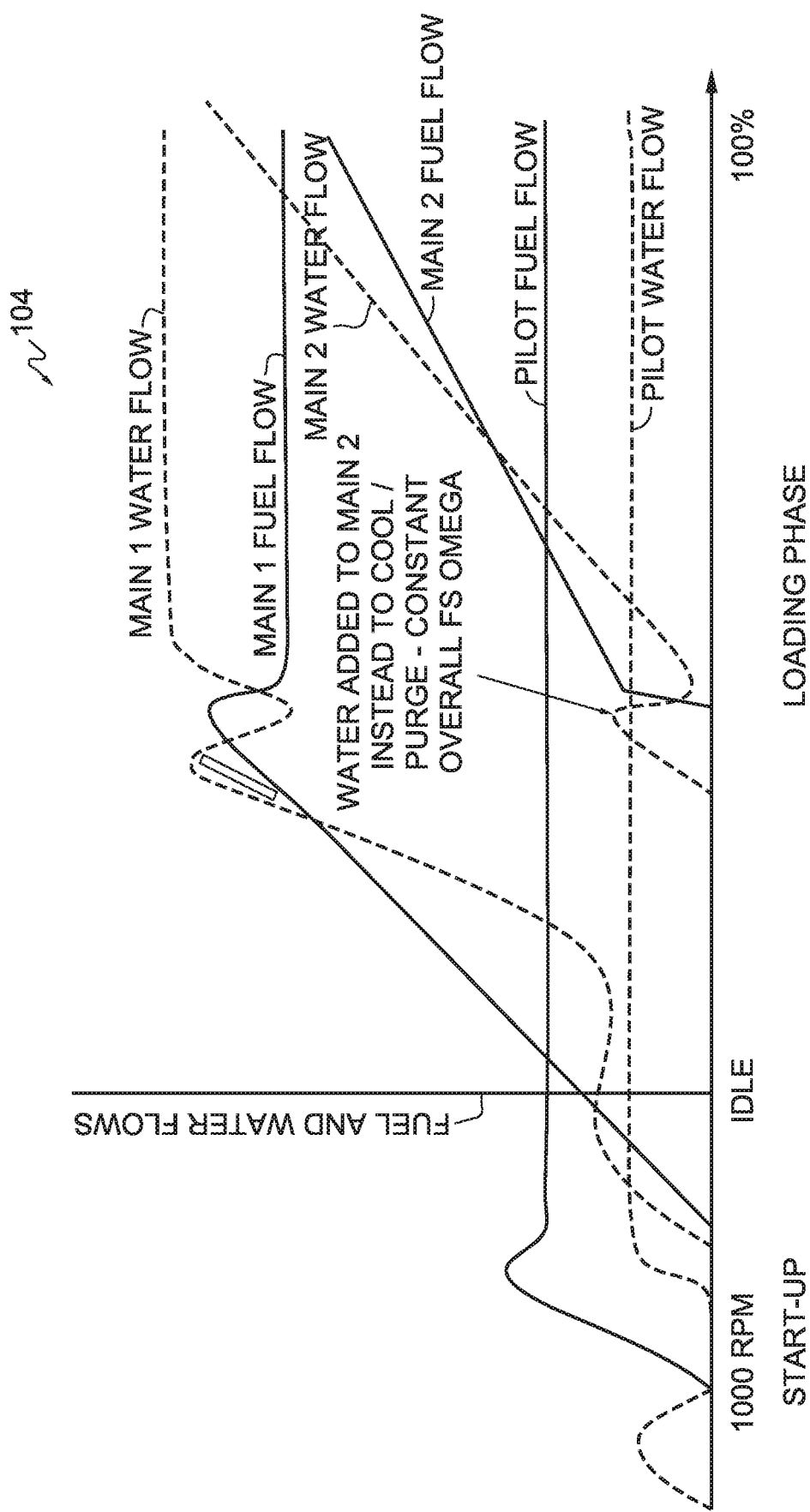
FIG. 15 depicts a staging process for a second main fuel and water circuit, a first main fuel and water circuit, and a pilot fuel and water circuit of a combustion system, in accordance with an embodiment of the present technology.

Referring now to FIG. 15, overlaid on the pilot fuel and water flow curves of FIGS. 12-13 and the first main fuel circuit curve of FIG. 14 is a set of fuel and water curves for a second main fuel circuit (i.e., main 2, which may be provided by the second fuel manifold 160 shown in FIG. 5). A second main fuel circuit may be introduced during engine loading to reduce oil system pressure requirements, provide more fuel for combustion, and/or other reasons. This second main fuel circuit stage is stabilized by the first main fuel circuit flame front and may be varied in fuel proportion relative to the first main fuel circuit stage to optimize an exit temperature profile of a combustor at higher loads, and to reduce coking. Initially, a water flow is provided to the second main fuel circuit in order to purge the passageways associated with the second main fuel circuit. The water flow may then be reduced while the fuel flow is increased in order to help ignite the fuel being injected by the second fuel circuit. Fuel and water flow to the second main fuel circuit may then be increased until the load on an associated gas turbine is at operating level. It should be noted that the fuel and water flow curves depicted in FIGS. 12-15 are exemplary embodiments, and other flow processes, ratios, or sequences of ignition are contemplated.

Referring now to FIGS. 16-19, a combustion system 200 with fuel injection at various locations is provided, in accordance with an embodiment of the present technology. In FIGS. 16-19, a combustor 201 is shown having a pilot air intake 206, a main air intake 208, and an injected fuel mixture 204 distributed into the combustor 201 at different fuel distribution locations 202. The injected fuel mixture 204 may be any composition, such as only water, a fuel/water mixture, or only fuel, for example. The location and angle of the injected fuel mixture 204 in the combustion system 200 may be varied to provide different fuel mixing and combustion effects within the combustor 201.

As one example, the injected fuel mixture 204 may be provided through the pilot air intake 206 from a fuel cartridge assembly 250 located towards a center of the combustor 201, as depicted in FIG. 16. Alternatively, the injected fuel mixture 204 may be provided through a portion 205 of the radial inflow swirler 140 which may function as the pilot air intake 206, as depicted in FIG. 17. The injected fuel mixture 204 may also be injected through a dome extension 210 of a combustor dome 212 of the combustor 201, as shown in FIG. 17. The injected fuel mixture 204 may alternatively be provided through the main mixer 130 into the main air intake 208 and into the combustor 201, as shown in FIG. 16. The dispersion of the injected fuel mixture 204 into the combustor 201 may be varied through use of different fuel injectors, different fuel injector locations, and/or use of different fuel nozzles (e.g., flat, circular, etc.).

Each distribution location 202 shown in FIGS. 16-19 and 22 may provide combustion benefits and tailored combustion characteristics. Injection from the main air intake 208 or the fuel cartridge assembly 250, as shown in FIGS. 16 and 22, respectively, may reduce water consumption, enhance flame stabilization, and improve temperature spread within the combustor 201. Injection through the radial inflow swirler 140 and the pilot air intake 206, as shown in FIG. 17, or along dome extension 210, as shown in FIG. 18, may reduce acoustical amplitudes, reduce coking, reduce flashback, and improve temperature spread, as well. Injection into the combustor 201 from the cylindrical combustion liner 110, as shown in FIG. 19, may reduce the coking, limit the possibility of flashback, and may optimize an outer temperature profile. Injection from a dome damper assembly 207 on the combustor dome 212, as shown in FIG. 22, may reduce water consumption, improve the outer temperature spread, and provide passage for premixing of air and fuel.

Referring back to FIGS. 3 and 5, depending on the amount of liquid fuel to be supplied to the different stages of a combustion system (e.g., combustion system 100 or 200) by the fuel cartridge assembly 150, the fuel passages 172 in communication with the first fuel manifold 158 may be contained within the fuel cartridge assembly 150 and the second fuel manifold 160 may be located radially outside of the first fuel manifold 158 and/or separate from the fuel cartridge assembly 150 to supply fuel at alternate injection locations, such as the distribution locations 202 shown in FIGS. 16-22. The injected fuel mixture 204 provided at these alternative distribution locations 202 may be fed from the second fuel manifold 160 located outside the cartridge assembly 150. The droplet distribution profile created by injection from these distribution locations 202 may be optimized for flame stability during loading, exit temperature distribution, liner coking, combustion dynamics, and emission controls.

It should be noted that in a combustor, fuel, fuel/water, and/or water injection into an air passage or combustion chamber may be applied in either a radial or axial direction, or rather, parallel or perpendicular to a flow of air into a combustion chamber, and/or may be combined to define an injection pattern which minimizes specific acoustic amplitudes. In this regard, under various combustor load conditions, each fuel circuit with its selected injector types may be operated and adjusted as needed.

Figure 20:
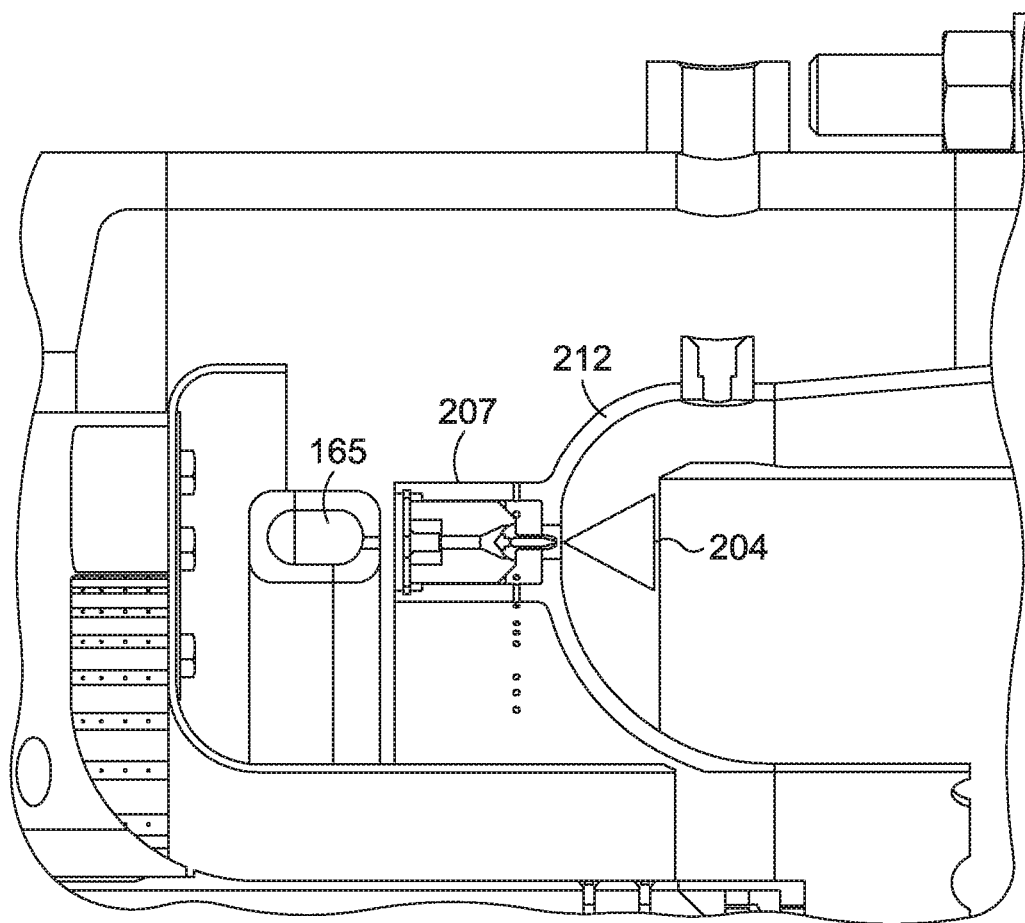
FIG. 20 depicts a partial cross-section view of a combustion system having liquid fuel injection capability and damping capability, in accordance with an embodiment of the present technology.
Figure 21:
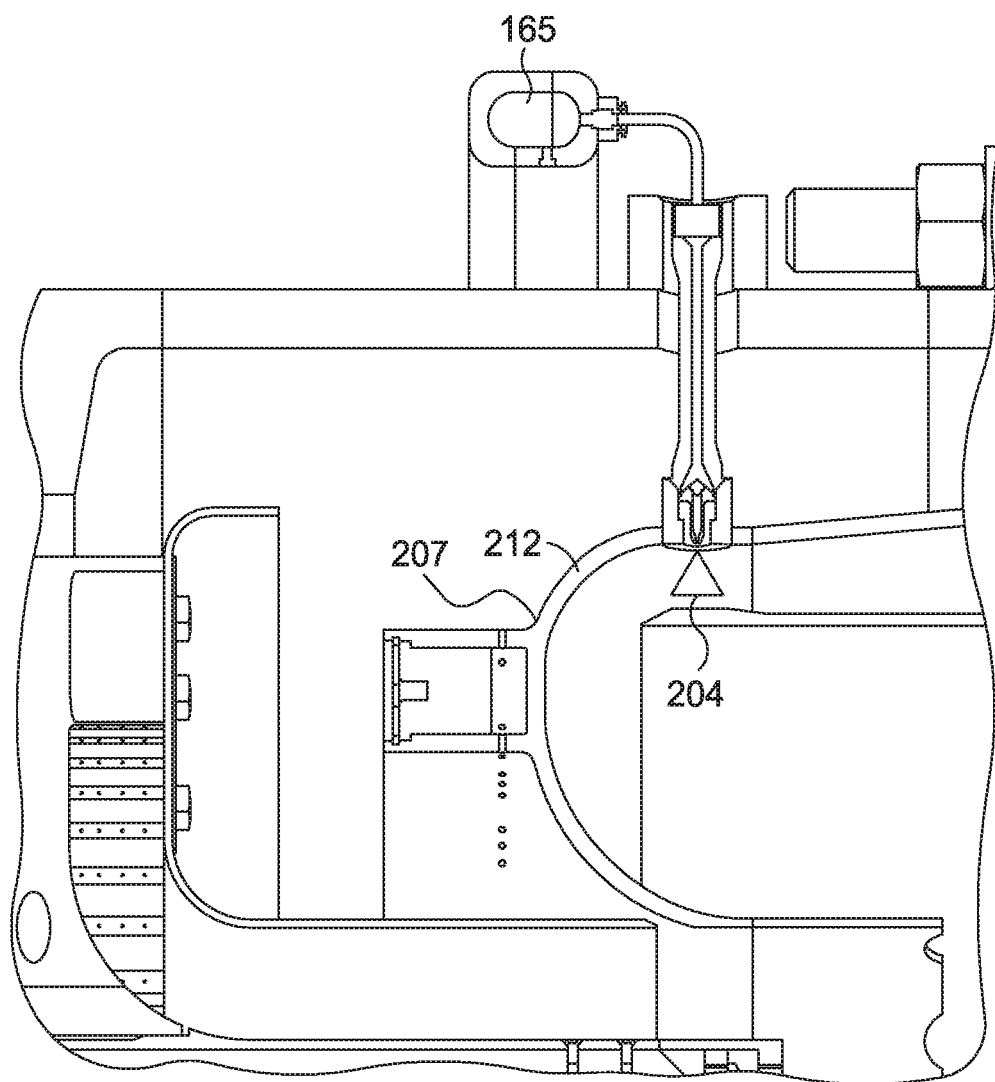
FIG. 21 depicts another partial cross-section view of the combustion system of FIG. 20 with a different fuel injection orientation, in accordance with an embodiment of the present technology.

Referring to FIGS. 20-21, a gas turbine combustor with one or more dome damper assemblies 207 affixed to a combustor dome 212 is provided, in accordance with an embodiment of the present technology. The dome damper assembly 207 in FIGS. 20-21 may help to dampen pressure oscillations within the combustor and may also provide an injection point for the injected fuel mixture 204 provided from a fuel injector 165 coupled to the dome damper assembly 207. The injected fuel mixture 204 may be injected in an axial direction through the dome damper assembly 207 relative to a center axis of the combustor, as shown in FIG. 20, or in a radial direction through the dome damper assembly 207 relative to a center axis of the combustor, as shown in FIG. 21.

Referring to FIG. 22, the combustion system 200 is again provided, in accordance with an embodiment of the present technology. In FIG. 22, the combustion system 200 is configured such that the injected fuel mixture 204 is provided from fuel distribution locations 202 at an end of the fuel cartridge assembly 250, which extends at least partially through the radial inflow swirler 140. Additionally, a fuel 214, such as the injected fuel mixture 204, is dispersed into the combustor 201 from distribution nozzles 216 which are located about the combustor dome 212. The fuel 214 may be provided by an attached fuel circuit and fuel injector, and may be a liquid or gaseous fuel and/or a fuel/water emulsion.

Referring to FIGS. 23-24, first and second configurations of a fuel cartridge assembly, such as the fuel cartridge assembly 150 shown in FIGS. 3 and 5, are provided, in accordance with an embodiment of the present technology.

In FIGS. 23-24, a rear view of the aft portion 154 of the fuel cartridge assembly 150 is provided. The fuel passages 172 are aligned in a circular configuration 218 about the centerbody 152. As shown by FIG. 23, the circular configuration 218 may be offset from a centerline of the fuel cartridge assembly 150, providing a first fuel input orientation relative to a combustor (e.g., combustor 201). In FIG. 24, the circular configuration 218 is generally aligned along the centerline of the fuel cartridge assembly 150, providing a second fuel input orientation relative to a combustor (e.g., the combustor 201). Different orientations, arrangements, and locations of the circular configurations 218 of fuel passages 172 are possible and contemplated in order to allow varied fuel distribution into an associated combustor. Additionally, the spray profile may be controlled and/or optimized by alternating or varying main 1 fuel stage 220 with main 2 fuel stage 221, as demonstrated in FIG. 24, and/or by alternating flat fan nozzles 222 with PSA nozzles 223 at an opposite end of the fuel passages 172 proximate the tip plate 164, as shown in FIG. 24.

Figure 25:
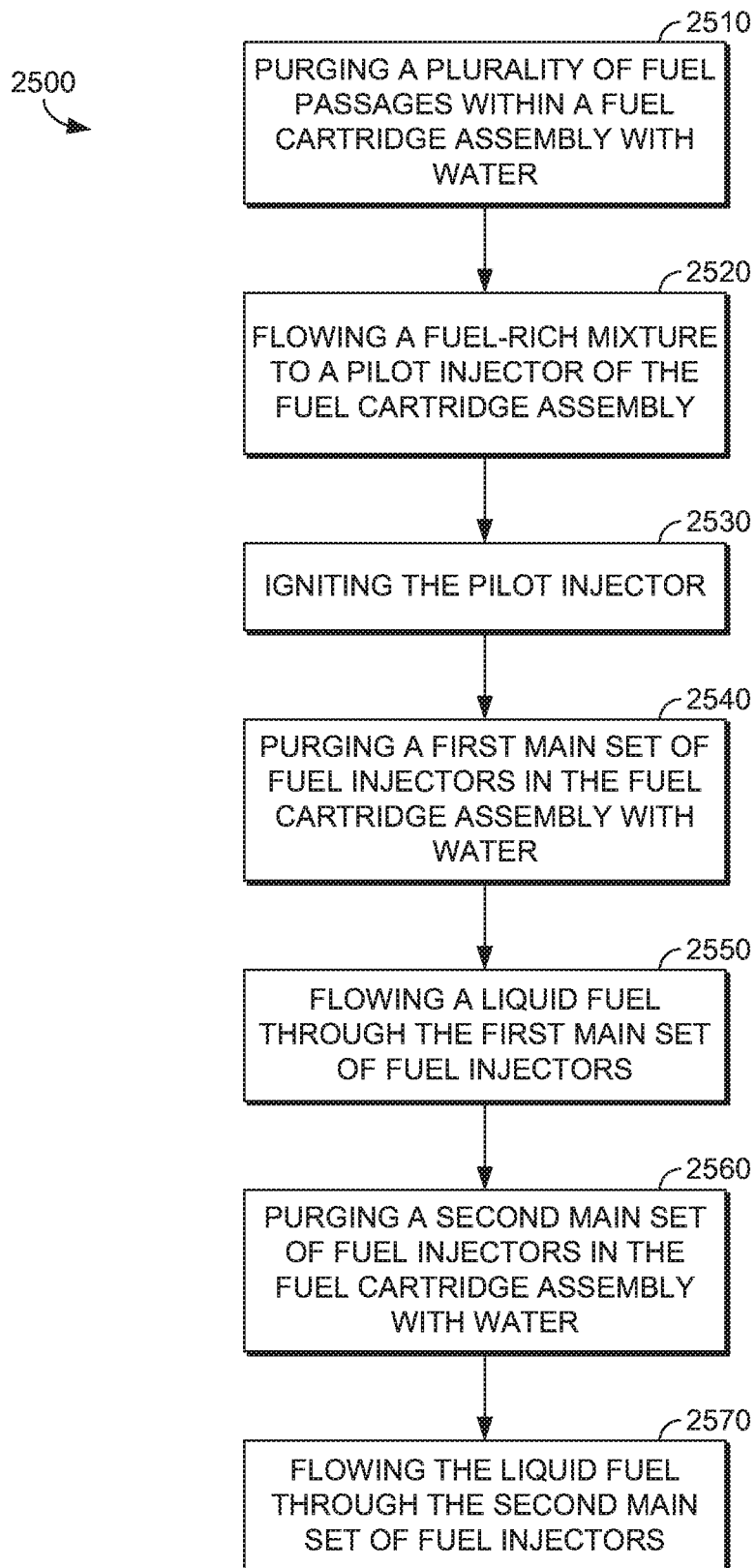
FIG. 25 depicts a block diagram of a first exemplary method of operating a gas turbine combustor, in accordance with an embodiment of the present technology.

Referring to FIG. 25, a block diagram 2500 of an exemplary method of staging a gas turbine combustor is provided, in accordance with an embodiment of the present technology. At a block 2510, a plurality of fuel passages, such as the fuel passages 172 shown in FIGS. 3 and 5, within a fuel cartridge assembly, such as the fuel cartridge assembly 150 shown in FIGS. 3 and 5, are purged with water. At a block 2520, a fuel-rich mixture is flowed to a pilot injector of the fuel cartridge assembly. At a block 2530, the pilot injector is ignited. At a block 2540, a first main set of fuel injectors in the fuel cartridge assembly is purged with water. At a block 2550, a liquid fuel is flowed through the first main set of fuel injectors. At a block 2560, a second main set of fuel injectors in the fuel cartridge assembly is purged with water. At a block 2570, the liquid fuel is flowed through the second main set of fuel injectors. The liquid fuel may be mixed with water to form an emulsion prior to flowing through the first and the second main sets of fuel injectors. Once the pilot injector is ignited and a pilot flame is established, an amount of water may be flowed through the pilot injector. In one exemplary embodiment, the first and the second main sets of fuel injectors may each comprise 6-12 fuel injectors and associated fuel injector tips.

Figure 26:
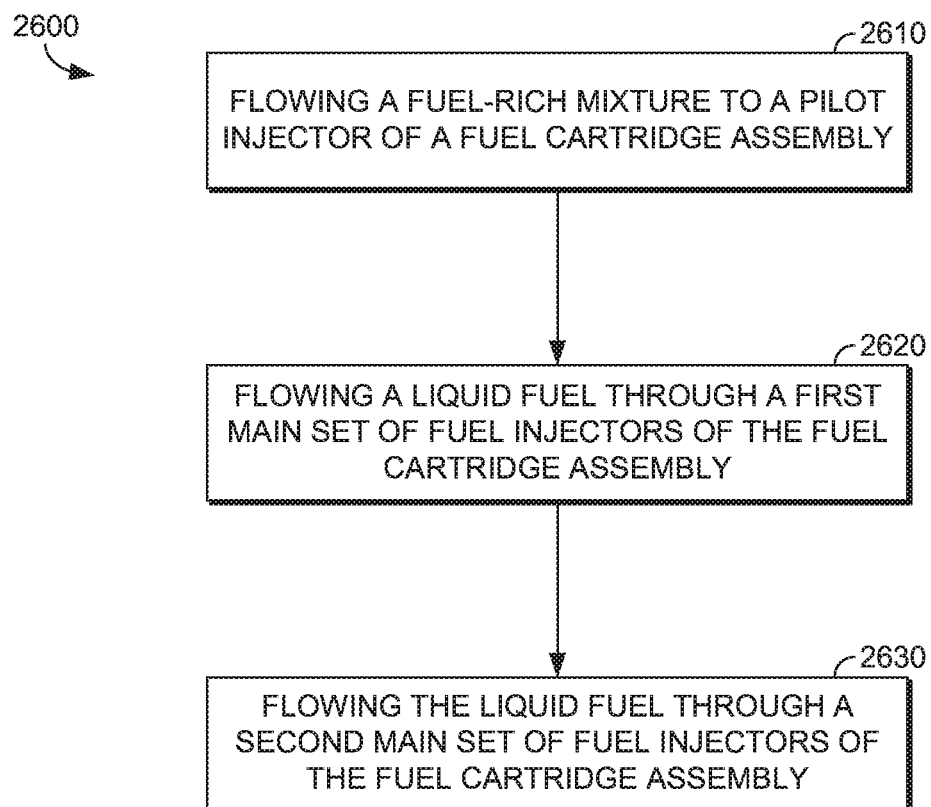
FIG. 26 depicts a block diagram of a second exemplary method of operating a gas turbine combustor, in accordance with an embodiment of the present technology.

Referring to FIG. 26, a block diagram 2600 of an exemplary method of operating a gas turbine combustor is provided, in accordance with an embodiment of the present technology. In FIG. 26, at a block 2610, a fuel-rich mixture is flowed to a pilot injector of a fuel cartridge assembly, such as the fuel cartridge assembly 150 shown in FIGS. 3-5. At a block 2620, a liquid fuel is flowed through a first main set of fuel injectors of the fuel cartridge assembly. At a block 2630, the liquid fuel is flowed through a second main set of fuel injectors of the liquid fuel cartridge assembly. The flow ratios between the pilot injector, the first main set of fuel injectors, and the second main set of fuel injectors may be adjustable to create a uniform or configured combustor exit temperature profile.

Referring to FIG. 27, a block diagram of an exemplary method of providing fuel injection locations based on combustor flows path is provided, in accordance with an embodiment of the present technology. At a block 2710, a combustion system, such as the combustion system 100, is provided. The combustion system may comprise a cylindrical combustion liner, such as the cylindrical combustion liner 110 shown in FIG. 1, having a center axis, such as the center axis A-A shown in FIG. 1, a flow sleeve, such as the flow sleeve 120 shown in FIG. 1, coupled to the cylindrical combustion liner and located radially outward of the cylindrical combustion liner relative to the center axis. The combustion system may further comprise a main mixer, such as the main mixer 130 shown in FIG. 1, coupled to the flow sleeve, a radial inflow swirler, such as the radial inflow swirler 140 shown in FIG. 1, coupled to the cylindrical combustion liner and providing fluid communication between an inside and an outside of the cylindrical combustion liner, a combustor dome, such as the combustor dome 212 shown in FIGS. 20-22, located at an end, such as the inlet end 114 shown in FIG. 1, of the cylindrical combustion liner, and a fuel cartridge assembly, such as the fuel cartridge assembly 150 shown in FIGS. 3 and 5, coupled to the cylindrical combustion liner and extending at least partially through the radial inflow swirler along the center axis.

Figure 28:
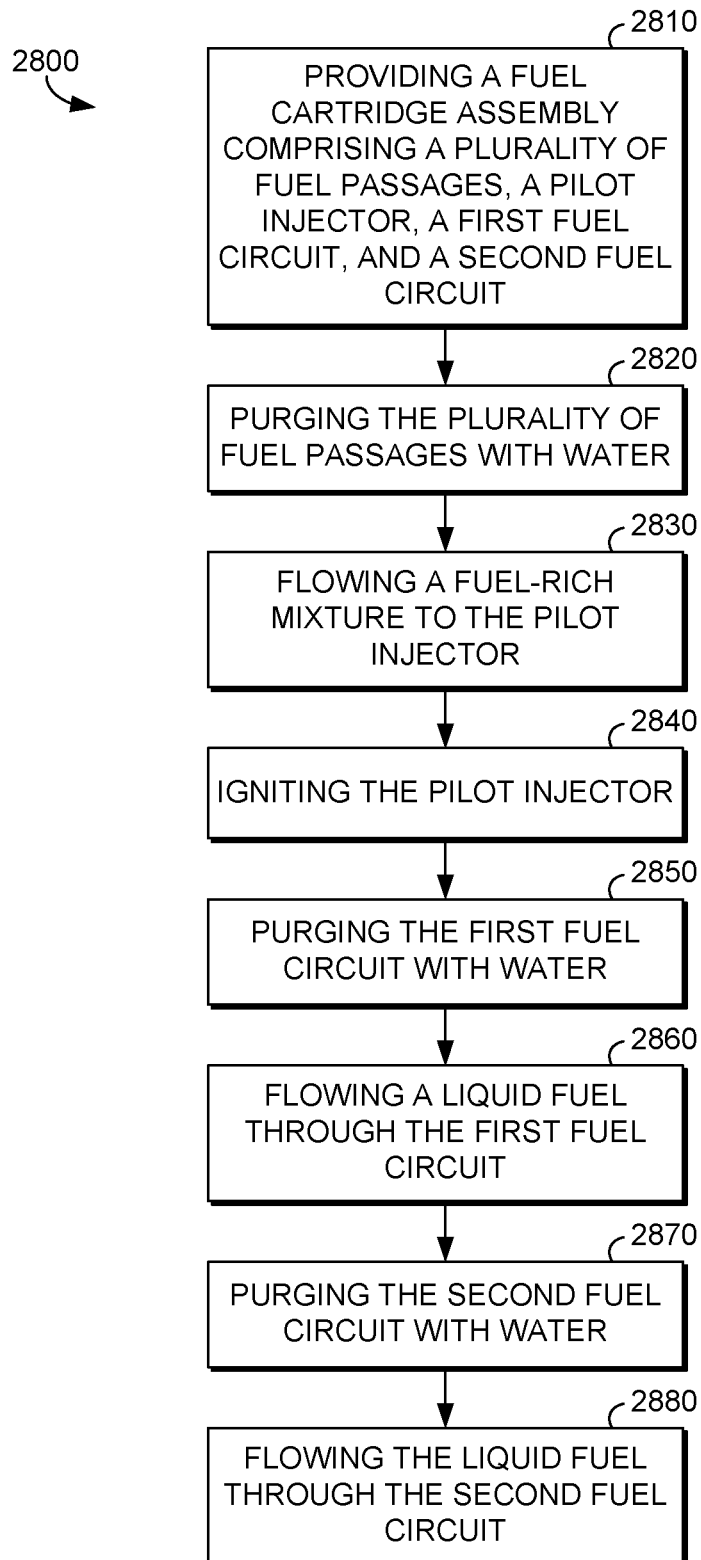
FIG. 28 depicts a block diagram of an exemplary method of staging a gas turbine combustor, in accordance with an embodiment of the present technology.

Referring to FIG. 28, a block diagram of an exemplary method 2800 of staging a gas turbine combustor is provided, in accordance with an embodiment of the present technology. At a block 2810, a fuel cartridge assembly is provided comprising a plurality of fuel passages, such as the fuel passages 172 shown in FIG. 3, a pilot injector, such as the pilot fuel injector 190 shown in FIG. 3, a first fuel circuit, such as the first fuel manifold 158 shown in FIGS. 3 and 5, and a second fuel circuit, such as the second fuel manifold 160 shown in FIGS. 3 and 5. At a block 2820, the plurality of fuel passages are purged with water. At a block 2830, a fuel-rich mixture is flowed to the pilot injector. At a block 2840, the pilot injector is ignited. At a block 2850, the first fuel circuit is purged with water. At a block 2860, a liquid fuel is flowed through the first fuel circuit. At a block 2870, the second fuel circuit is purged with water. At a block 2880, the liquid fuel is flowed through the second fuel circuit.

In exemplary embodiments, the first fuel circuit may comprise a fuel injector coupled to a first fuel supply and to a first fuel manifold in fluid communication with a first number of a plurality of fuel passages, and the second fuel circuit may comprise a second fuel injector coupled to a second fuel supply and to a second fuel manifold in fluid communication with a second number of the plurality of fuel passages. The liquid fuel may be mixed with water to form a fuel and water emulsion prior to flowing it through the first and second fuel circuits. Water may be flowed through the pilot injector once the pilot injector is ignited and a pilot flame is established. The fuel cartridge assembly may further comprise an ignition system, such as a spark igniter or a torch igniter. The liquid fuel flowing through the first main set of fuel injectors and/or the second main set of fuel injectors may further be ignited using the ignition system.

Additionally, water flow to the pilot injector may be provided to purge the pilot injector prior to flowing the fuel-rich mixture through the pilot injector. Additionally, fuel may be supplied to the pilot injector starting with ignition, and may be supplemented through a full speed no-load condition of the turbine with the first fuel circuit in instances where the pilot fuel nozzle exhibits pressure limitations. After the pilot, the first fuel circuit, and the second fuel circuit have been established in operation, an injected fuel mixture (e.g., a water/fuel emulsion or liquid fuel) flowing through either the first fuel circuit or the second fuel circuit may be transitioned to primarily water as the opposing fuel circuit transitions in kind to primarily fuel (e.g., liquid fuel). Separation of fuel and water to distinct circuits may be useful in circumstances when water consumption of the turbine is being monitored to control operational characteristics.

Figure 29:
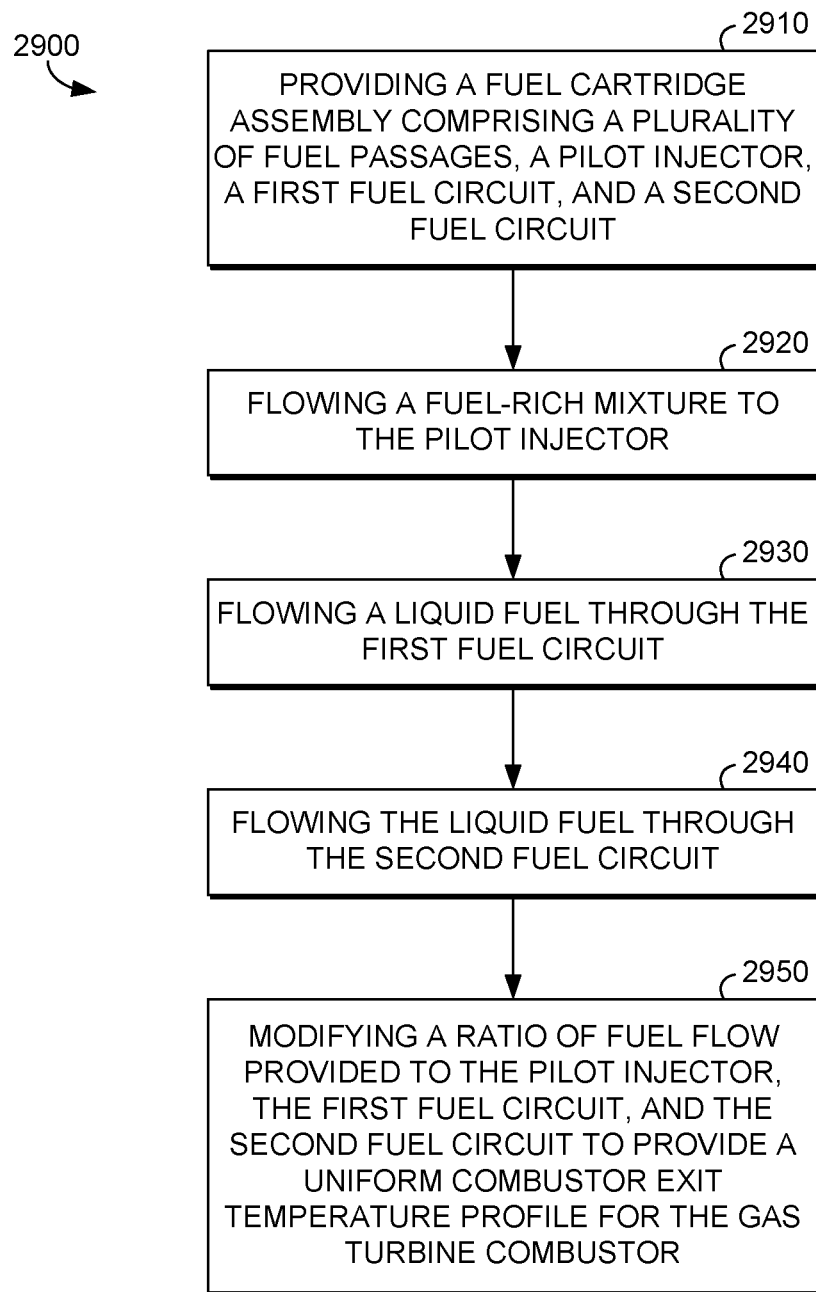
FIG. 29 depicts a block diagram of an exemplary method of operating a gas turbine combustor, in accordance with an embodiment of the present technology.

Referring to FIG. 29, a block diagram of an exemplary method 2900 of operating a gas turbine combustor is provided, in accordance with an embodiment of the present technology. At block 2910, a fuel cartridge assembly is provided comprising a plurality of fuel passages, such as the fuel passages 172 shown in FIGS. 3 and 5, a pilot injector, such as the pilot fuel injector 190 shown in FIG. 4, a first fuel circuit, such as the first fuel manifold 158 shown in FIGS. 3 and 5, and a second fuel circuit, such as the second fuel manifold 160 shown in FIGS. 3 and 5. At a block 2920, a fuel-rich mixture is flowed to the pilot injector. At a block 2930, a liquid fuel is flowed through the first fuel circuit. At a block 2940, the liquid fuel is flowed through the second fuel circuit. At a block 2950, a ratio of fuel flow provided to the pilot injector, the first fuel circuit, and the second fuel circuit is modified to provide a uniform combustor exit temperature profile for the gas turbine combustor.

In additional embodiments, the first fuel circuit may comprise a fuel injector coupled to a first fuel supply and to a first fuel manifold in fluid communication with a first number of the plurality of fuel passages, and the second fuel circuit may comprise a second fuel injector coupled to a second fuel supply and to a second fuel manifold in fluid communication a second number of the plurality of fuel passages. The first or second number of fuel passages may comprise a greater number of fuel passages, or the first and second number of fuel passages may be equal. A constant flow of water may be maintained through the first fuel circuit along with the liquid fuel provided to the first fuel circuit while the flow of liquid fuel to the second fuel circuit is increased. Additionally, a flow of water to the second fuel circuit may be increased or decreased as the liquid fuel is flowed to the second liquid fuel circuit. A flow and a fuel to water ratio of the pilot injector may be maintained when the liquid fuel is flowed to the first fuel circuit and to the second fuel circuit.

In another exemplary embodiment, a system for staging a gas turbine combustor is provided. The system comprising a gas turbine combustor, such as the combustor 201 shown in FIGS. 16-19, comprising at least a fuel cartridge assembly, such as the fuel cartridge assembly 150 shown in FIGS. 3 and 5, comprising a first fuel circuit including a first fuel manifold, such as the first fuel manifold 158 shown in FIGS. 3 and 5, within the fuel cartridge assembly, a second fuel circuit including a second fuel manifold, such as the second fuel manifold 160 shown in FIGS. 3 and 5, within the fuel cartridge assembly or outside of the fuel cartridge assembly, and a pilot fuel injector, such as the pilot fuel injector 190 shown in FIG. 4. A first liquid fuel supply and a first water supply may be coupled to the first fuel circuit, a second liquid fuel supply and a second water supply may be coupled to the second fuel circuit, and a third fuel supply and a third water supply may be coupled to the pilot fuel injector. The ratio of fuel-to-water in each of the first fuel circuit, the second fuel circuit, and the pilot fuel injector may be adjustable during concurrent operation or during operation of the combustor.

It should be noted that combustors and combustion systems described herein may include one or more fuel injection locations on a fuel cartridge assembly, a radial inflow swirler, a main mixer, or on a cylindrical combustion liner. Any or all of the locations may be configured to be coupled to a fuel circuit to supply liquid fuel, gaseous fuel, or any variant of a fuel/water emulsion, allowing an associated combustor to operate on liquid or gaseous fuel. Although certain fuel injection locations and fuel types are specifically discussed herein, the type and location of fuel injected into an exemplary dual fuel combustor may be varied as desired.

From the foregoing, it will be seen that the technology described herein is well adapted to attain all the ends and objects set forth above. It will be understood that certain features and sub-combinations are of utility and may be employed without reference to other features and sub-combinations. Alternative embodiments will become apparent to those of ordinary skill in the art to which the present technology pertains without departing from its scope. Different combinations of elements, as well as use of elements not shown, are possible and contemplated.

What is claimed is:

1. A fuel cartridge assembly, comprising:
a centerbody comprising:
an aft portion comprising at least a first fuel manifold and a second fuel manifold;
a main body extending from the aft portion and having a first passageway contained therein;
a plurality of fuel passages extending axially from the aft portion and terminating at a tip plate, wherein each fuel passage of the plurality of fuel passages includes a pair of open ends at an upstream axial end of each fuel passage, wherein a first fuel injection coupling directly couples a first open end of the pair of open ends to the first fuel manifold such that the first open end is coupled to the first fuel manifold and not to the second fuel manifold, and wherein a second fuel injection coupling directly couples a second open end of the pair of open ends to the second fuel manifold such that the second open end is coupled to the second fuel manifold and not to the first fuel manifold, and wherein each fuel passage of the plurality of fuel passages is in communication with the first fuel manifold or the second fuel manifold via the first open end or the second open end, respectively; and
the tip plate coupled to an end of the main body opposite the aft portion, the tip plate having at least one ignition opening and a plurality of openings corresponding to the plurality of axially extending fuel passages.

2. The assembly of claim 1, wherein the centerbody further comprises a plurality of fuel injector tips coupled to the respective plurality of fuel passages, each of the plurality of fuel injector tips circumscribed at least partially by one of the plurality of openings in the tip plate.

3. The assembly of claim 2, wherein the fuel injector tips are positioned in the respective plurality of openings such that the fuel injector tips are movable relative to the tip plate.

4. The assembly of claim 1, wherein the first fuel manifold is coupled to a first fuel circuit that provides a first fuel source and the second fuel manifold is coupled to a second fuel circuit that provides a second fuel source.

5. The assembly of claim 1, wherein for each fuel passage of the plurality of fuel passages that is in communication with the first fuel manifold, the second fuel injection coupling is completely obstructed prohibiting any fuel flow therethrough, and wherein for each fuel passage of the plurality of fuel passages that is in communication with the second fuel manifold, the first fuel injection coupling is completely obstructed prohibiting any fuel flow therethrough.

6. The assembly of claim 5, wherein the obstructed first fuel injection coupling is obstructed with at least one of a plug weld or a braze joint, and wherein the obstructed second fuel injection coupling is obstructed with at least one of a plug weld or a braze joint.

7. The assembly of claim 1, wherein the first passageway is configured to receive pressurized air, and wherein the tip plate further comprises a plurality of air holes through which the pressurized air may be expelled.

8. The assembly of claim 1, further comprising a pilot fuel injector extending axially through the main body to the tip plate.

9. The assembly of claim 1, further comprising a spark igniter coupled to the tip plate at an ignition opening.

10. The assembly of claim 1, further comprising a torch igniter coupled to the tip plate at an ignition opening.

11. A liquid fuel cartridge assembly, comprising:
a centerbody comprising:
an aft portion comprising at least a first fuel manifold and a second fuel manifold;
a main body extending from the aft portion and having a first passageway contained therein;
a plurality of fuel passages extending axially from the aft portion and terminating at a tip plate, wherein each fuel passage of the plurality of fuel passages includes a pair of open ends at an upstream axial end of each fuel passage, wherein a first fuel injection coupling directly couples a first open end of the pair of open ends to the first fuel manifold such that the first open end is coupled to the first fuel manifold and not to the second fuel manifold, and wherein a second fuel injection coupling directly couples a second open end of the pair of open ends to the second fuel manifold such that the second open end is coupled to the second fuel manifold and not to the first fuel manifold, and wherein each fuel passage of the plurality of fuel passages is in communication with the first fuel manifold or the second fuel manifold via the first open end or the second open end, respectively;
the tip plate coupled to an end of the main body opposite the aft portion, the tip plate having a plurality of openings corresponding to the plurality of axially extending fuel passages;
a first outer sleeve coupled to the aft portion; and
a second outer sleeve coupled and coaxial to the main body, wherein the first and second outer sleeves are movable relative to each other.

12. The assembly of claim 11, further comprising a plurality of fuel injector tips, each fuel injector tip of the plurality of fuel injector tips coupled to one of the plurality of fuel passages and circumscribed at least partially by one of the plurality of openings in the tip plate.

13. The assembly of claim 12, wherein each of the plurality of fuel injector tips is one of:
a flat fan nozzle; and
a pressure swirl atomizer nozzle.

14. The assembly of claim 11, wherein a first number of the fuel passages are in fluid communication with the first fuel manifold and a second number of the fuel passages are in fluid communication with the second fuel manifold, and wherein the first number and the second number are positioned in an alternating configuration about the main body.

15. The assembly of claim 11, further comprising a plurality of removable fastening systems coupled to the second outer sleeve and to the main body.

16. The assembly of claim 15, wherein each of the plurality of removable fastening systems comprises at least a locking insert and a set screw, the locking insert positioned in a respective opening in the main body, the set screw rotatably coupled to the locking insert to provide a countersinking force against the second outer sleeve.

17. The assembly of claim 16, wherein at least a portion of the plurality of removable fastening systems are tack-welded.

18. The assembly of claim 11, further comprising a retaining C-clip coupled between the first outer sleeve and the second outer sleeve to at least partially restrict movement of the first outer sleeve relative to the second outer sleeve.

19. A combustion system for a gas turbine, the system comprising:
 a cylindrical combustion liner having a center axis;
 a flow sleeve coupled to the cylindrical combustion liner and positioned radially outward of the cylindrical combustion liner;
 a main mixer coupled to the flow sleeve and positioned radially outward of the cylindrical combustion liner, the main mixer configured to inject at least one of a gaseous and a liquid fuel into the cylindrical combustion liner;
 a combustor dome coupled to the flow sleeve and to the cylindrical combustion liner;
 a radial inflow swirler coupled to the cylindrical combustion liner and providing fluid communication between an inside and an outside of the cylindrical combustion liner, the radial inflow swirler configured to inject at least one of a gaseous and a liquid fuel into the cylindrical combustion liner; and
 a fuel cartridge assembly comprising
 a centerbody, the centerbody comprising:
  an aft portion comprising at least a first fuel manifold and a second fuel manifold;
  a main body extending from the aft portion and having a first passageway contained therein;
  a plurality of fuel passages extending axially from the aft portion and terminating at a tip plate, wherein each fuel passage of the plurality of fuel passages includes a pair of open ends at an upstream axial end of each fuel passage, wherein a first fuel injection coupling directly couples a first open end of the pair of open ends to the first fuel manifold such that the first open end is coupled to the first fuel manifold and not to the second fuel manifold, and wherein a second fuel injection coupling directly couples a second open end of the pair of open ends to the second fuel manifold such that the second open end is coupled to the second fuel manifold and not to the first fuel manifold, and wherein each fuel passage of the plurality of fuel passages is in communication with the first fuel manifold or the second fuel manifold via the first open end or the second open end, respectively; and
  the tip plate coupled to an end of the main body opposite the aft portion, the tip plate having at least one ignition opening and a plurality of openings corresponding to the plurality of axially extending fuel passages.

20. The system of claim 19, wherein the first fuel manifold and the second fuel manifold are each coupled to a liquid fuel circuit, and wherein the second fuel manifold is coupled to at least one of the flow sleeve, the main mixer, and the radial inflow swirler for supplying fuel therethrough.

* * * * *